(12) United States Patent
Trantzas et al.

(10) Patent No.: US 6,370,961 B1
(45) Date of Patent: Apr. 16, 2002

(54) NIPPED ROLLER IMPRESSION SENSOR SYSTEM

(76) Inventors: Constantin M. Trantzas, 38 Gordan Ave., Briarcliff Manor, NY (US) 10510; Douglas D. Haas, Jr., 56 Signal Trail, Sparta, NJ (US) 07871

( * ) Notice: Subject to any disclaimer, the term of this patent is extended or adjusted under 35 U.S.C. 154(b) by 0 days.

(21) Appl. No.: 09/239,610

(22) Filed: Jan. 29, 1999

(51) Int. Cl.⁷ .............................................. G01N 3/08
(52) U.S. Cl. ........................................................ 73/824
(58) Field of Search ............................ 73/824, 862.55, 73/862.68, 862.045, 159, 862.625

(56) References Cited

U.S. PATENT DOCUMENTS

| | | | |
|---|---|---|---|
| 4,016,756 A | 4/1977 | Kunkle | 73/141 |
| 4,220,815 A | 9/1980 | Gibson et al. | 178/18 |
| 4,233,011 A | 11/1980 | Bolender et al. | 15/14 |
| 4,509,237 A | 4/1985 | Volz et al. | 29/116 |
| 4,520,723 A | 6/1985 | Pav et al. | 100/162 |
| 4,529,959 A | 7/1985 | Ito et al. | 338/295 |
| 4,707,570 A | 11/1987 | Ide et al. | 178/18 |
| 4,712,472 A | 12/1987 | Meisen et al. | 100/37 |
| 4,729,153 A | 3/1988 | Pav et al. | 29/116 |
| 4,898,012 A | 2/1990 | Jones et al. | 72/11 |
| 5,048,353 A | 9/1991 | Justus | 73/862 |
| 5,072,077 A | 12/1991 | Klein | 200/5 |
| 5,379,652 A | 1/1995 | Allonen | 73/862 |
| 5,383,371 A | 1/1995 | Laitenen | 73/862 |
| 4,220,815 C1 | 9/1996 | Gibson et al. | 178/18 |
| 5,562,027 A * | 10/1996 | Moore | 73/862.55 |
| 5,592,875 A | 1/1997 | Moschel | 100/99 |
| 5,629,488 A * | 5/1997 | Kropp | 73/862.68 |
| 5,699,729 A | 12/1997 | Moschel | 100/99 |
| 5,821,433 A * | 10/1998 | Goldman et al. | 73/862.55 |
| 5,953,230 A | 9/1999 | Moore | 364/469 |

FOREIGN PATENT DOCUMENTS

| | | | |
|---|---|---|---|
| JP | 6015533 | 1/1985 | |
| JP | 6015534 | 1/1985 | |
| JP | 62165135 | 7/1987 | |
| JP | 01157850 | 6/1989 | 13/24 |
| JP | 221727 | 8/1992 | |
| JP | 06182977 | 7/1994 | 33/14 |

OTHER PUBLICATIONS

*Tactile Sensing, 1990's Style,* ASSEMBLY magazine, pp. 23–26, Feb./Mar. 1993.
Moore and Kennedy, Electronic Nip Impressions—A New Diagnostic Approach, TAPPI Engineering Conference Report, pp. 547–551.
Web Page http://www.btrplc.com, "Stowe Woodward Moves Up the Value Leader", by Bill Butterfield and Robert Moore, Nov. 23, 1998.
Haverty and Fildes, Enhancing Computer Game Joysticks With Smart Force Transducers, Sensors Journal, Sep. 1998, pp. 91–96.
Tekscan Product Data.
UniForce Product Data.
Interlink Product Data.
InControl Solutions Product Data.

* cited by examiner

*Primary Examiner*—Benjamin R. Fuller
*Assistant Examiner*—Octavia Davis
(74) *Attorney, Agent, or Firm*—Sofer & Haroun, LLP

(57) ABSTRACT

A nipped roller impression sensor system comprising a first roller having an axis of rotation and a surface and a second roller having an axis of rotation that is substantially parallel to the axis of rotation of the first roller, wherein the second roller is disposed so that a surface of the second roller exerts pressure on the surface of the first roller at a nip having a width. The nipped roller impression sensor system also comprises at least one pressure sensor device configured to be disposed at the nip between the first and second rollers. The pressure sensor device comprises a resistive electrode maintained in a non-conductive arrangement with a shunt electrode by at least one spacer element, such that a width of the nip corresponds to a change in resistance across the resistive electrode when the second roller exerts pressure on the first roller.

48 Claims, 20 Drawing Sheets

FSR FORCE/RESISTANCE CHARACTERISTIC

200    AT NO NIP PRESSURE, MEASURE RESISTANCE BETWEEN AX AND RESISTANCE BETWEEN BY

202    NIP PRESSURE IS EXERTED BY INSERTING SENSOR BETWEEN ROLLERS

204    MEASURE RESISTANCE BETWEEN AX AND RESISTANCE BETWEEN BY

206    MEASURE RESISTANCE BETWEEN AC AND RESISTANCE BETWEEN BD

208    CONVERT RESISTANCE VALUES INTO INCHES

210    CALCULATE COEFFICIENTS C1 AND C2

212    CALCULATE LINEAR DISTANCE EC, FD, AC, AND BD

214    CALCULATE ANGLE θ, WHEREIN θ IS THE ANGLE OF THE PRESSURE SENSOR RELATIVE TO THE ROLLERS

216    CALCULATE NIP WIDTHS EK AND FG

218    CALCULATE THE AVERAGE NIP WIDTH

220    DETERMINE THE PRESSURE BETWEEN THE ROLLERS CORRESPONDING TO THE NIP WIDTH

FIG. 14

NIPPED ROLLER IMPRESSION SENSOR SYSTEM

RELATED APPLICATIONS

This application is related to a copending patent application U.S. application Ser. No. 09/240,381, and is incorporated herein by reference.

FIELD OF THE INVENTION

This invention relates to a nipped roller impression sensor system, and more particularly to a system employing a pressure sensor device for insertion between nipped rollers.

BACKGROUND OF THE INVENTION

Nipped rollers, i.e.—two rollers that operate in contact with each other such as illustrated in FIG. 1, are used in many industries. For instance, in the paper making and converting industries, nipped rollers are used to process paper by removing water from the sheet and providing a desired finish to the paper. In order to do this, a constant and desired amount of pressure must be maintained between the nipped rollers so as to impart desired properties to the sheets without damaging them. Some of the consequences of failing to maintain a constant and desired amount of pressure between the rollers are sheet wrinkles, excessive sheet breaks, damaged rollers, etc. As such, paper mill operators routinely need to measure the pressure exerted by the nipped rollers, and if necessary, adjust the position of the rollers so as to reacquire a desired amount of pressure therebetween.

The prior art teaches a variety of ways to measure pressure between a pair of nipped rollers so as to determine the width of a nip. One approach used to sense the uniformity of the pressure between nip rollers is disclosed in U.S. Pat. No. 5,562,027 to Moore, entitled "Dynamic Nip Pressure and Temperature Sensing System", which discloses a system that comprises a roller having sensors disposed thereon for measuring pressure at several locations along the roll length, wherein the measurements obtained by the system are transmitted to a computer and display, and in one embodiment, corrective measures are initiated. The pressure sensors, as disclosed, can be piezoelectric, piezoresistive, strain gauges, etc. and are mounted directly onto the rollers. Thus, once during each revolution of the roller, the sensor is positioned between the rollers and thus experiences pressure between the rollers, whereby the sensor transmits a signal representing the amount of pressure experienced to the computer and display.

Another approach used in the prior art to measure the width of a nip between a pair of rollers is to pass a sheet of carbon paper on a white backing material between the rollers, and to analyze the impression or resulting mark. FIG. 4 illustrates a sample of an impression made by the carbon paper procedure. However, for several reasons, this procedure is inadequate to measure the width of the nip between the rollers.

First, this procedure cannot be performed while the machine is in operation. The machine must be stopped so that the carbon paper may be placed between the rollers when the rollers are in the open position (i.e.—when the rollers are not in contact with each other). The rollers are then brought into contact with each other and the pressure between the rollers causes the carbon paper to leave an impression on the backing paper. The carbon paper cannot be positioned between the rollers while the rollers have paper passing therebetween, since the paper would not be adequately pressed when the rollers are opened to insert the carbon paper. Thus, the procedure is typically only performed during machine down-times (e.g.—when the machine is out of service due to breakdowns or service interruptions).

Additionally, the method of taking carbon paper impressions is inadequate when three or more rollers are disposed consecutively, as shown in FIG. 2. This follows because an adjustment made to the position of one of the three or more rollers causes the pressure to change between each other pair of rollers. Furthermore, if an impression has been made on carbon paper between one pair of rollers and the rollers are adjusted so as to reduce the pressure therebetween, a new sheet of carbon paper needs to be inserted between all of the pairs of rollers. The lower pressures between each pair of rollers would result in narrower markings, which would be obscured by the wider markings taken at the higher pressure. Thus, adjusting three or more rollers is very time-consuming and labor intensive, since every roller adjustment made would have an unintended effect on the pressure between other pairs of rollers, requiring that new carbon paper impressions to be taken.

Also, the time required to perform the analysis of the carbon paper impressions is undesirably lengthy. Because of this analysis time, corrective action that needs to be taken (i.e.—adjustments made to the positioning of the rollers) is often delayed until a next down-time, rather than the down-time when the pressure was taken. This causes the quality of the rolled product to suffer, since the position of the rollers could be adjusted immediately if the time for analysis was shorter.

In an attempt to improve upon the method of taking carbon paper impressions, force sensing resistors are employed in the prior art in order to measure an amount of force between nipped rollers. FIG. 5 illustrates one example of a force sensing resistor—a linear potentiometer—having two polymer films or sheets. On one sheet, a conducting pattern is deposited on the polymer in the form of interdigiting electrodes 2. Semi-conducting polymer 1, which is a pressure-responsive resistive layer having a force/resistance characteristic such as illustrated in the graph of FIG. 6, is deposited on the other sheet. The pressure-responsive resistive layer, as shown in FIG. 6, has a resistance that decreases as the pressure on the layer increases. When the two sheets of the force sensing resistor are brought together but no pressure is exerted thereon, the resistance between the interdigiting electrodes is very high. However, when the force sensing resistor is inserted between the rollers and pressure is exerted thereon, the resistance of semi-conducting polymer 1 reduces sufficiently to shunt an electrical conduction at the interdigiting electrodes where the pressure is exerted.

One problem with traditional force sensing resistors in the prior art, however, is that they are inaccurate. For instance, a nip pressure applied to a prior art sensor may inadvertently shunt an electrical conduction through an area of the force sensing layer that exceeds the particular area where pressure is applied. This occurs because, when a pressure is applied to the force sensing layer, the force is spread over the force sensing layer. This problem is worsened if an overlay or laminating surface is used, since the force is further spread out over the force sensing layer. Traditional force sensing resistors in the prior art also require substantial calibration, and must account for such variables as temperature, humidity, and aging. In addition, the pressure-responsive resistive layer is expensive to use.

Thus, there is a need for an improved and inexpensive system for measuring the width (or impression) and the position of a nip accurately and conveniently without the need for calibration.

SUMMARY OF THE INVENTION

According to one embodiment, the present invention is directed to a nipped roller impression sensor system comprising a first roller having an axis of rotation and a surface and a second roller having an axis of rotation that is substantially parallel to the axis of rotation of the first roller, wherein the second roller is disposed so that a surface of the second roller exerts pressure on the surface of the first roller at a nip having a width. The nipped roller impression sensor system also comprises at least one pressure sensor device configured to be disposed at the nip between the first and second rollers. The pressure sensor device comprises a resistive electrode maintained in a non-conductive arrangement with a shunt electrode by at least one spacer element, such that a width of the nip corresponds to a change in resistance across the resistive electrode when the second roller exerts pressure on the first roller.

According to another embodiment, a position of the nip corresponds to a change in resistance between the shunt electrode and a location along the resistive electrode. According to another embodiment, the system further comprises a means for measuring a change in resistance across the resistive electrode and a change in resistance between the shunt electrode and a location along the resistive electrode. According to another embodiment, the system further comprises a processor for calculating the width and position of the nip. According to another embodiment, the impression sensor system comprises two pressure sensor devices, and the processor is configured to calculate a width and a position of the nip at each of the pressure sensor devices. According to another embodiment, the system is further configured to adjust the calculated nip width if a position of the nip measured by a first pressure sensor device differs from the position of the nip measured by a second pressure sensor device. According to another embodiment, the adjusted nip width corresponds to the angle of the pressure sensor device relative to the rollers.

BRIEF DESCRIPTION OF THE DRAWINGS

In the drawings in which like reference characters denote similar elements throughout the several views:

FIG. 14 is a flow chart that illustrates the steps to measure the nip width and nip pressure between a pair of nipped rollers, in accordance with one embodiment of the invention;

DETAILED DESCRIPTION OF THE INVENTION

Figure 8A:
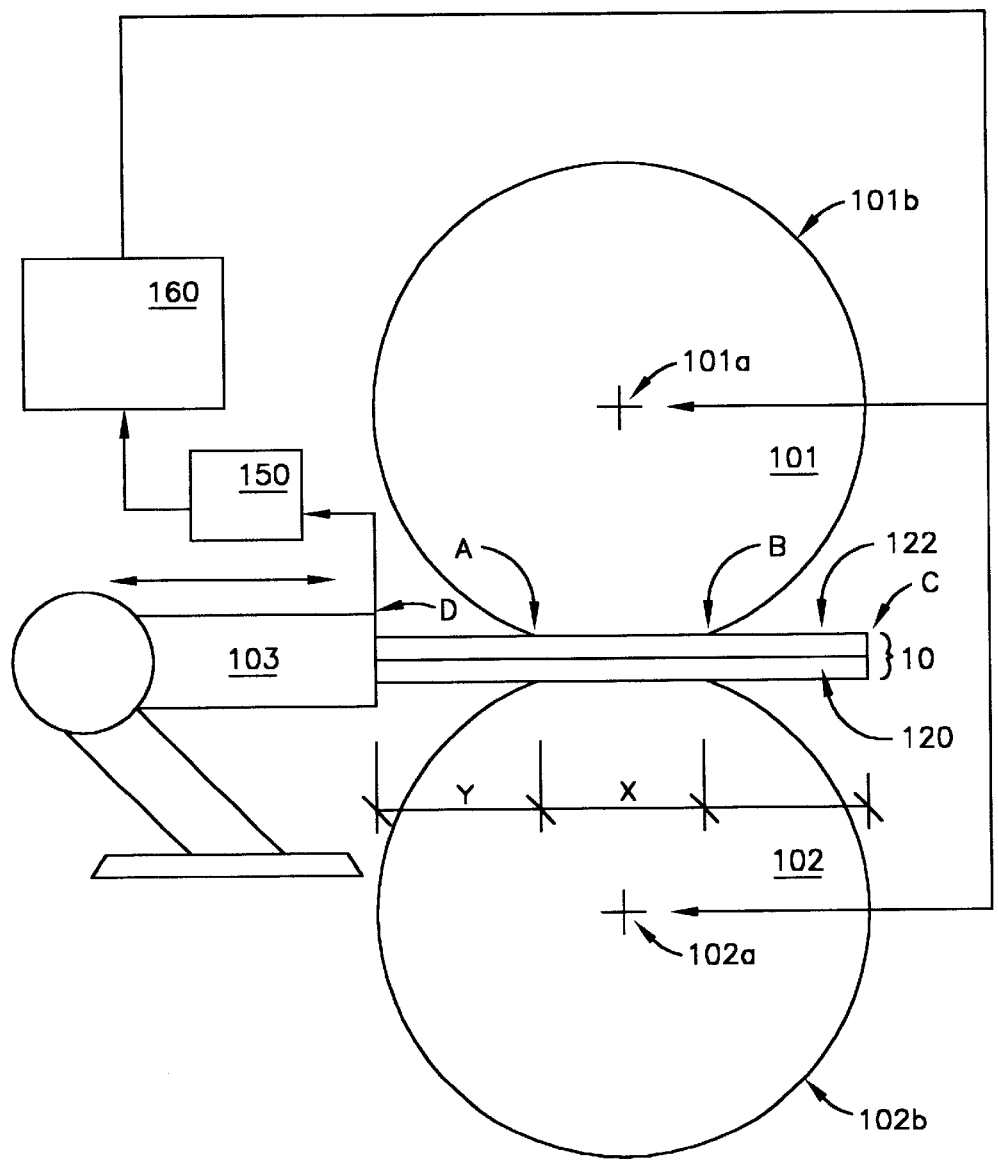
FIG. 8(a) illustrates a side view of a nipped roller impression sensor system, in accordance with one embodiment of the present invention.

FIG. 8(a) illustrates a cross-sectional view of a nipped roller impression sensor system, in accordance with one embodiment of the present invention. As shown in the figure, first roller 101 has axis of rotation 101a and surface 101b. Second roller 102 has axis of rotation 102a that is substantially parallel to axis of rotation 101a of first roller 101. Second roller 102 is disposed so that, when the two rollers are in operation, surface 102b of second roller 102 exerts pressure on surface 101b of first roller 101 at a nip having a width. Thus, an impression is formed between first roller 101 and second roller 102. The width of the nip is shown in FIG. 8(a) as linear distance x, and is defined by point A and point B, which are the outer edges of the pressure between the rollers.

As shown in FIG. 8(a), the impression sensor system also comprises, according to one embodiment of the present invention, pressure sensor device 10. Pressure sensor device 10 is configured to be disposed between first roller 101 and second roller 102, at the nip. Additional features of pressure sensor device 10 are shown in FIGS. 8(b)–25 and are explained in detail below.

FIG. 8(a) also shows insertion device 103 for disposing pressure sensor device 10 between the rollers at the nip. Specifically, the figure illustrates insertion device 103, that is configured to secure one end of pressure sensor device 10 and that moves so as to insert the free end of pressure sensor device 10 between the rollers. While the figure illustrates a mechanical arm configured for this purpose, the present invention is not intended to be limited in scope by the means for inserting the pressure sensor device between the rollers.

Pressure sensor device 10 is also coupled to input/output (hereinafter "I/O") device 150. Generally, I/O device 150 is a device, such as an ohm-meter, for measuring the resistance between various electrodes of pressure sensor device 10, which are described in detail below. I/O device 150 is coupled to processor 160, which, according to one embodiment, performs calculations (discussed in greater detail below) relating to the resistance measured between the various electrodes of pressure sensor device 10. Generally, processor 160 calculates the width of the nip between the rollers and the location of the nip on the sensor. Additionally, processor 160, according to one embodiment, calculates an amount of pressure that exists between the nipped rollers. According to one embodiment, processor 160 is also coupled to the rollers, so as to initiate adjustment of the rollers in order to maintain a constant and desired amount of pressure between the rollers.

It should be noted that, in accordance with another embodiment of the invention, I/O device 150 is not an ohm-meter but a device for calculating the time required for a capacitor to be charged via the electrodes. For instance, instead of measuring the resistance between first and second electrodes 121 and 125, this embodiment employs a capacitor that receives the conduction provided between first and second electrodes 121 and 125, and a timer that determines the amount of time required for the capacitor to charge. Similarly, instead of measuring the resistance between first and shunt electrodes 121 and 123, this embodiment employs a capacitor that receives the conduction provided between first and shunt electrodes 121 and 123, and a timer that determines the amount of time required for the capacitor to charge. In still another embodiment, the resistance between the various electrodes is measured by determining the voltage drop across the resistor or by determining the current through the resistor.

Figure 8B:
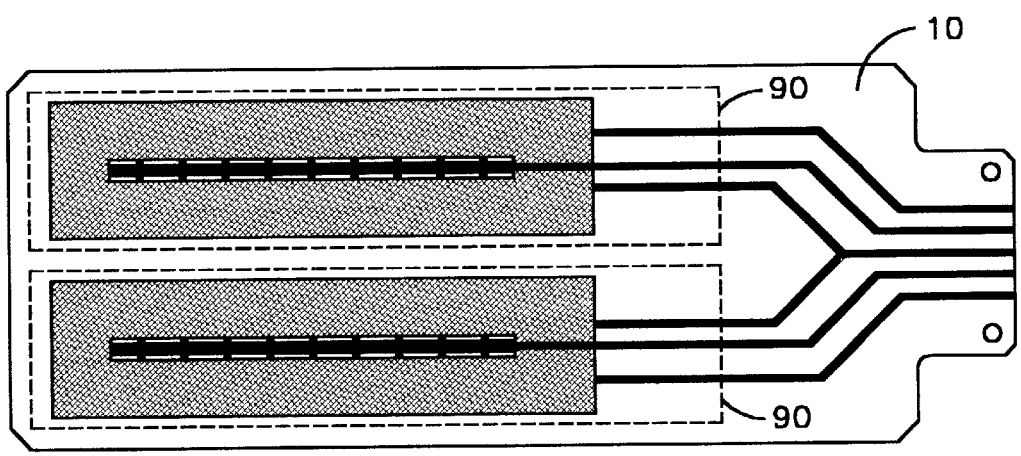
FIG. 8(b) illustrates a pressure sensing device, in accordance with one embodiment of the present invention.

FIG. 8(b) shows pressure sensor device 10 in plan view. Pressure sensing device 10 is also discussed in detail in Applicants' co-pending application, designated U.S. application Ser. No. 09/240,381, which is incorporated by reference herein as fully as if set forth in its entirety. As will be further explained below, pressure sensor device 10 preferably has two pressure sensing arrangements 90 disposed thereon, although it is recognized that a single pressure sensing arrangement, or more than two pressure sensing arrangements, may be employed by the pressure sensing device of the present invention.

Figure 8C:
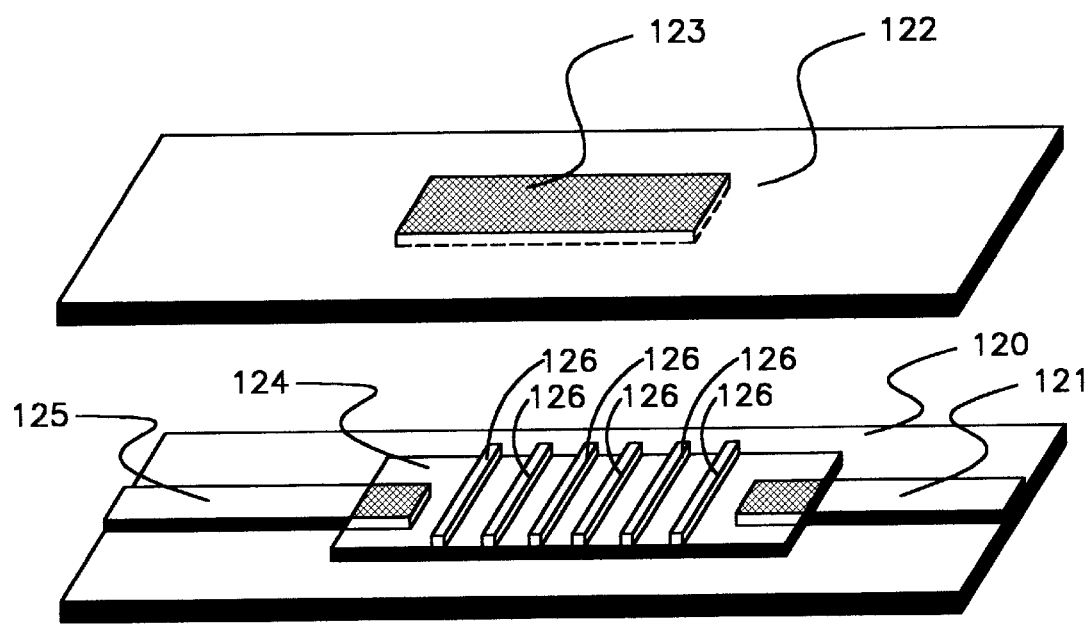
FIG. 8(c) illustrates the features of a pressure sensing device, in accordance with one embodiment of the present invention.

FIG. 8(c) illustrates the salient features of each pressure sensing arrangement 90 of pressure sensor device 10, in accordance with one embodiment of the present invention. In the embodiment shown, first electrode 121 and second electrode 125 are disposed on first backing sheet 120, which is preferably thin and flexible. Coupled to first electrode 121 and second electrode 125 is resistive electrode 124, which provides an electrical conduction between first electrode 121 and second electrode 125. Resistive electrode 124 has a known resistance. Shunt electrode 123 is disposed on second backing sheet 122, which is also preferably thin and flexible. Shunt electrode 123 has a resistance that is lower than the resistance of resistive electrode 124.

Figure 9:
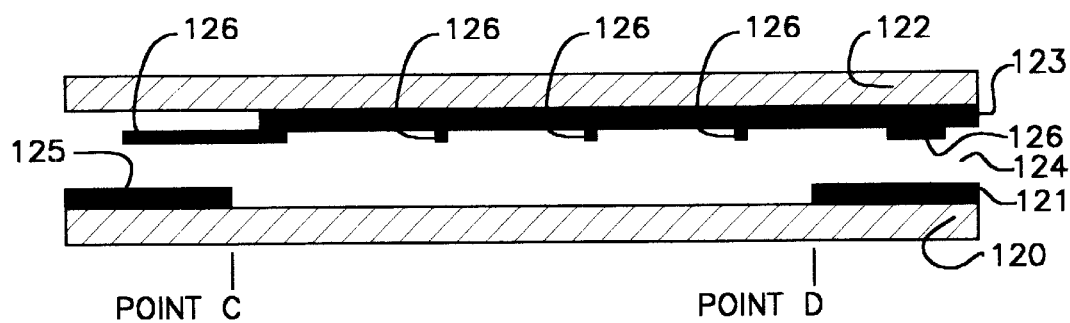
FIG. 9 is a cross-sectional view of first and second backing sheets brought together, in accordance with one embodiment of the invention.

In the embodiment shown, at least one spacer element 126 is disposed on resistive electrode 124. According to one embodiment of the invention, backing sheets 120 and 122 are brought together so that shunt electrode 123 is disposed on spacer elements 126. FIG. 9, which is a cross-sectional view of first backing sheet 120 brought together with second backing sheet 122, shows that spacer elements 126 maintain shunt electrode 123 in a non-conductive arrangement relative to resistive electrode 124. FIG. 9 also shows that, according to one embodiment, shunt electrode 123 is disposed in a non-conductive arrangement relative to first and second electrodes 121 and 125.

It should be noted, however, that according to another embodiment of the invention, pressure sensor device 10 employs resistive electrode 124 insulated from shunt electrode 123 by at least one spacer 126. In this embodiment, electrodes 121 and 125 are not employed. As such, all measurements may be made along desired locations on resistive electrode 124.

As previously indicated, first and second backing sheets 120 and 122 are preferably thin (preferably about 0.001 inches in thickness) and flexible, although it is recognized that one of the two backing sheets may be solid. Preferably, the backing sheets are made from substantially non-conductive, flexible material such as Kapton™, Mylar™ or polyester. If a solid material is used for either of the backing sheets, non-conductive materials such as plastics and derivatives may be utilized. In another embodiment of the invention, second backing sheet 122 is conductive so that second backing sheet 122 and shunt electrode 123 form a single, integrated whole.

First, second and shunt electrodes 121, 125 and 123 are preferably comprised of conductive or semi-conductive material such as silver, copper, aluminum, etc. First, second and shunt electrodes 121, 125 and 123 may be disposed on first or second backing sheets 120 and 122 by etching, printing, silk-screening or spraying the material onto the backing sheets. In the case of printing the electrode on a backing sheet, a graphite-based polymer, thick film ink may be used, such as Electrodag 423SS™ offered by Acheson Colloids Co.™

Resistive electrode 124 is preferably comprised of a relatively less conductive, more highly resistive, material having a known resistance, such as carbon. In the preferred embodiment, the resistance of resistive electrode 124 is linear, such that the resistance of the electrode changes linearly relative to the length of the electrode. Resistive electrode 124, like the other electrodes, may be disposed on a backing sheet by etching, printing, silk-screening or spraying the material thereon. In the case of printing the electrode on a backing sheet, a titanium dioxide resistive ink may be used, such as Ink type SS24210™ offered by Acheson Colloids Co.™

Spacer elements 126 are preferably electrically insulating materials, such as acrylic or oil based inks and paints. Like the electrodes, spacer elements 126 may be disposed on a backing sheet by etching, printing, silk-screening or spraying the electrically insulating material thereon. Alternatively, in embodiments such as those described below in FIGS. 21, 22 and 24, windowed spacer element 126 may comprise a sheet of Mylar™, Kapton™ or polyester material having windows disposed therein. In this embodiment, windowed spacer element 127 may be held in position by an adhesive.

Additionally, it is noted that, in a preferred embodiment, the pressure sensor apparatus is laminated or heat-sealed so as to protect it in wet or harsh environments.

Each pressure sensing arrangement 90 of pressure sensing device 10, in accordance with the present invention, allows at least two measurements to be determined when the sensor is inserted between two nipped rollers. The first measurement corresponds to the width of the nip between the rollers. The second measurement corresponds to the position of the nip on the sensor.

With respect to the first measurement, according to one embodiment, when no pressure is acting upon pressure sensor device 10, an electrical conduction is provided between first and second electrodes 121 and 125 via resistive electrode 124. The electrical conduction provided is determined by the resistance of resistive electrode 124, the thickness of resistive electrode 124 and the linear distance between first and second electrodes 121 and 125. When pressure does act upon the sensor, shunt electrode 123 is displaced at the position of the force towards resistive electrode 124, and causes an electrical conduction to be provided between resistive electrode 124 and shunt electrode 123.

Figure 10:
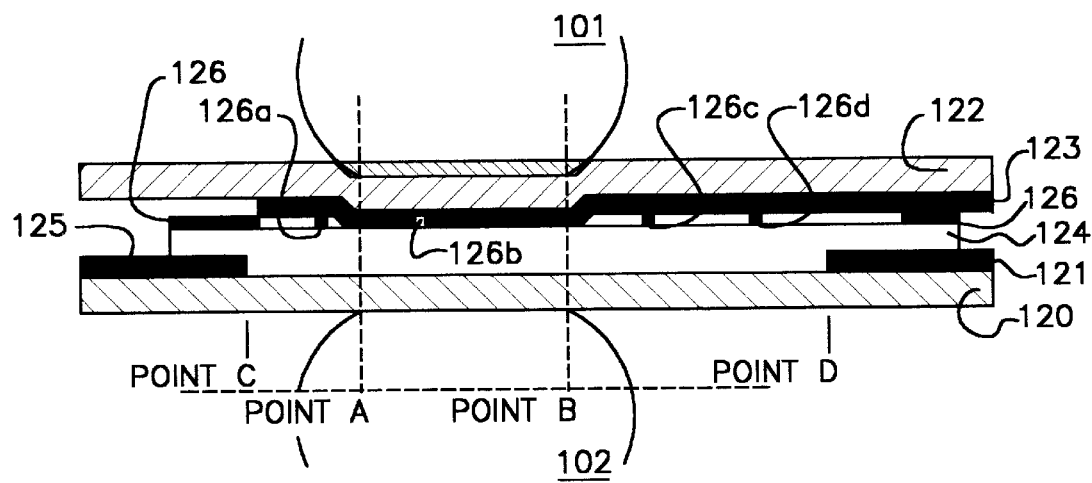
FIG. 10 shows a pair of rollers that applies pressure on the sensor, in accordance with one embodiment of the invention.

For instance, FIG. 10 shows rollers 101 and 102 that apply pressure on the sensor between points A and B, which are the outer edges of the nip. As shown, between points A and B, shunt electrode 123 contacts resistive electrode 124. Due to the relative low resistance of shunt electrode 123, an electrical current is shorted through shunt electrode 123 from point A to point B. The shorting of the current through shunt electrode 124 reduces the total resistance of resistive electrode 124 from first electrode 121 to second electrode 125. The change in the resistance of resistive electrode 124 corresponds to the linear distance from point A to point B, and is measurable by I/O device 150 functioning as an ohm-meter.

In the preferred embodiment, the resistance of resistive electrode 124 is linear. In this embodiment, the linear distance from point A to point B is equal to the linear distance between first electrode 121 and second electrode 125, multiplied by the ratio of the change in the resistance of resistive electrode 124 over the original resistance between first electrode 121 and second electrode 125.

Figure 1:
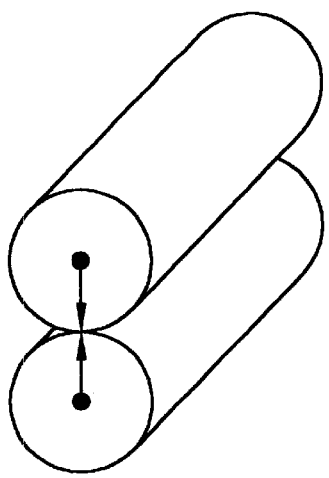
FIG. 1 illustrates a pair of nipped rollers, in accordance with one embodiment of the present invention.
Figure 2:
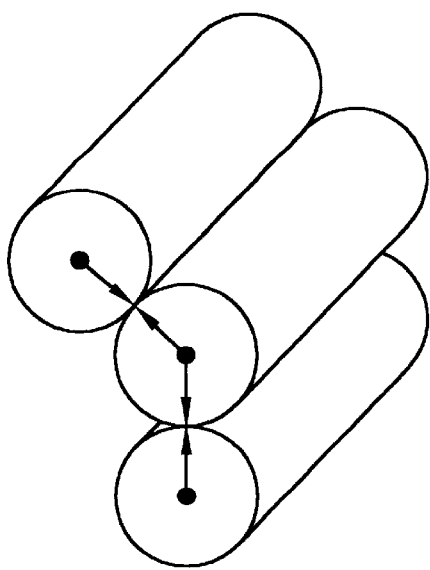
FIG. 2 illustrates three nipped rollers, in accordance with one embodiment of the present invention.
Figure 3:
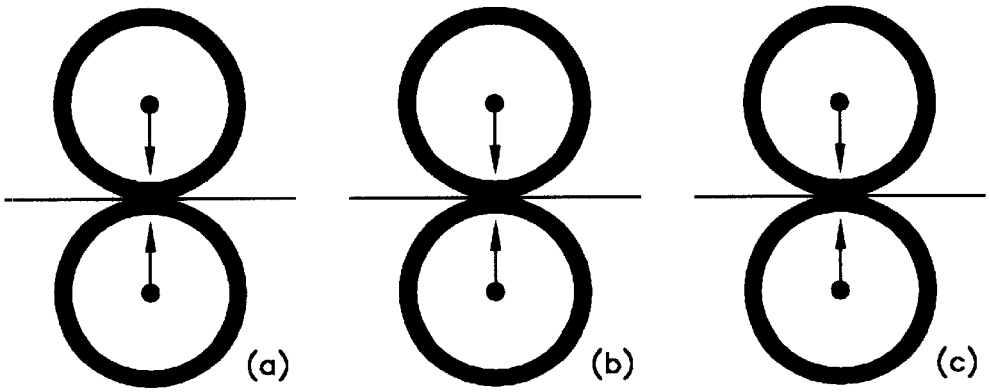
FIGS. 3(a)–(c) illustrate the effect of pressure on a nip width.

According to one embodiment of the invention, the linear distance from point A to point B also corresponds to the nip pressure between the rollers. This follows because, in some cases, the nip width is dependent on the characteristics of the surfaces of the rollers and the pressure between the rollers. For instance, as shown in FIG. 3(a), if the surface of the rollers is solid, the nip width will be small, since the rollers will contact each other virtually at a single point regardless of the pressure. However, if the surface of the rollers consists of rubber or another compressible material, the nip width will be small when the pressure between the rollers is small as shown in FIG. 3(b), and larger when the pressure between the rollers is increased as shown in FIG. 3(c). According to one embodiment, the surface material of the rollers is known and processor 160 is configured to determine the nip pressure corresponding to the measured nip width.

Additionally, as mentioned above, the sensor arrangement of the present invention allows a second measurement, corresponding to the position of the nip on the sensor, to be determined. Returning to FIG. 17, when pressure is exerted on shunt electrode 123 and causes shunt electrode 123 to contact resistive electrode 124, an electrical conduction is provided between first electrode 121 and shunt electrode 123. Prior to the exertion of pressure, the resistance between first electrode 121 and shunt electrode 123 is infinite, because spacer elements 126 produce an open circuit. When pressure is exerted, however, the circuit is closed and the resistance between first electrode 121 and shunt electrode 123 is measurable by I/O device 150. The resistance between first electrode 121 and shunt electrode 123 corresponds to the linear distance from point D at electrode 121 to point B at the outer edges of the location of pressure.

Spacer elements 126 prevent pressure at the nip from being spread, i.e.—permitting an electrical conduction through an area that is larger than the particular area that pressure is applied to. In other words, spacer elements 126 prevent shunt electrode 123 from contacting resistive electrode 124 at any point except at the location of nip pressure. This is evident in FIG. 10, which shows that shunt electrode 123 is disposed in a non-conducting arrangement relative to resistive electrode 124 except where the rollers exerts pressure. Spacer element 126a prevents pressure from being spread to the left of the nip width, and spacer element 126c prevents pressure from being spread to the right of the nip width. The resistors of the prior art, by contrast, do not employ spacer elements. As a result, pressure which is exerted on a resistor of the prior art is spread to interdigiting electrodes not located in the particular area of the nip pressure, causing the calculated pressure to be inaccurate. The position of the nip pressure, according to one embodiment, is employed to determine whether either roller, and hence the contact point between the two rollers, has been displaced during operation.

In the preferred embodiment of the invention, the position of the nip pressure is determined so as to insure that the measured nip width is accurate, as discussed below. This is accomplished, as shown in FIG. 8(b), by employing at least two pressure sensing arrangements 90 disposed on a single pair of backing sheets. In this embodiment, the position of pressure at each pressure sensing arrangement 90 is determined, and the position data is used to more accurately calculate the nip width.

Figure 11:
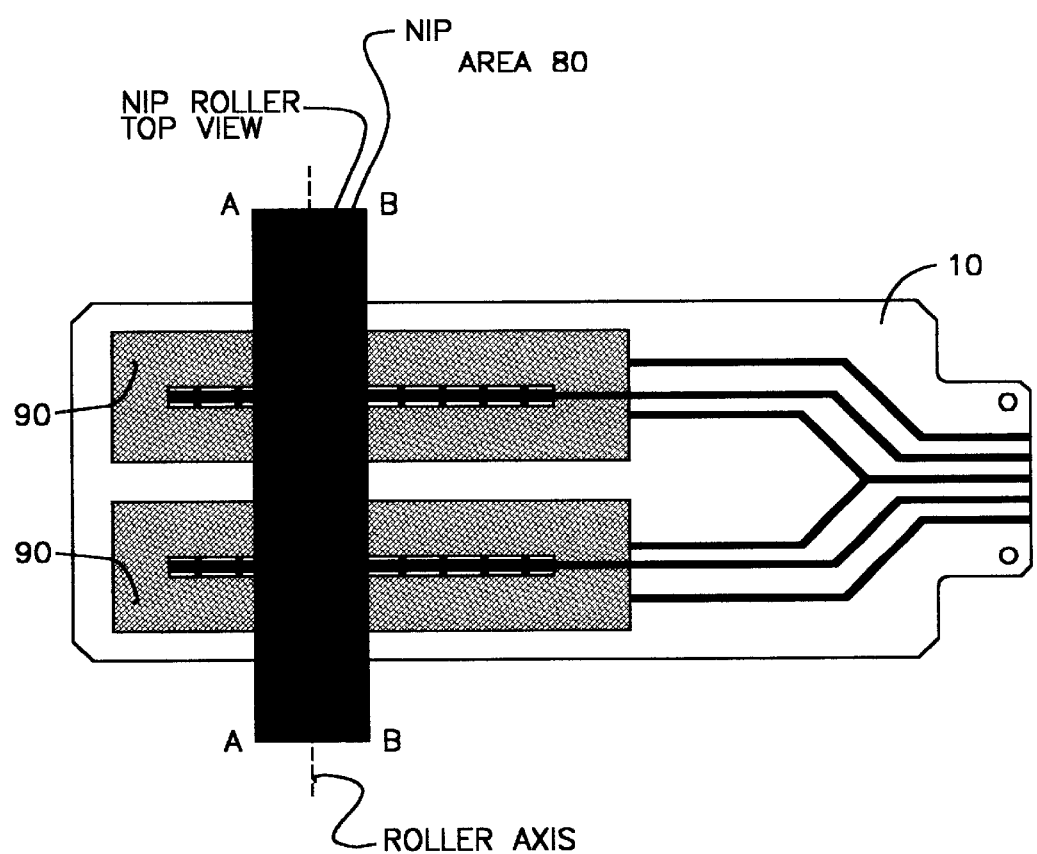
FIG. 11 shows the sensor perpendicular to the rollers, in accordance with one embodiment of the invention.

FIG. 11 illustrates pressure sensing device 10, having two sensing arrangements disposed thereon, positioned relative to nip roller area 80. Nip roller area 80 is the region that the two rollers are in contact with each other. As shown in FIG. 11, pressure sensing device 10 is disposed perpendicular to outer edges A—A and B—B of area 80. Outer edges A—A and B—B are parallel to the axes of the rollers and thus, as illustrated, the sensors are disposed substantially perpendicular to the axis of the rollers. As a result, the width calculated by the system of the present invention corresponds to the actual nip width between the rollers.

Figure 12:
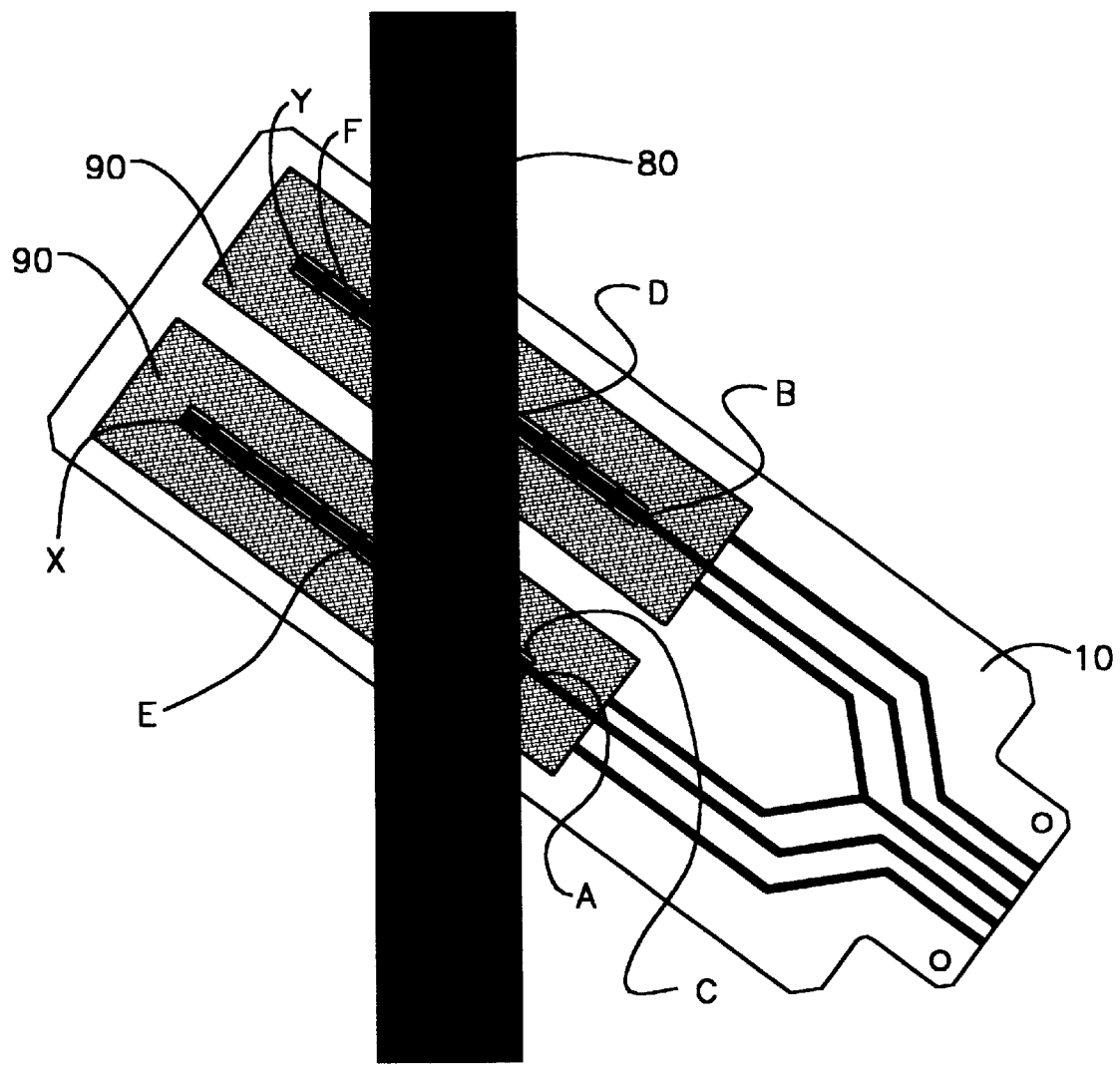
FIGS. 12 and 13 show the sensor positioned non-perpendicular to the rollers, in accordance with one embodiment of the invention.
Figure 13:
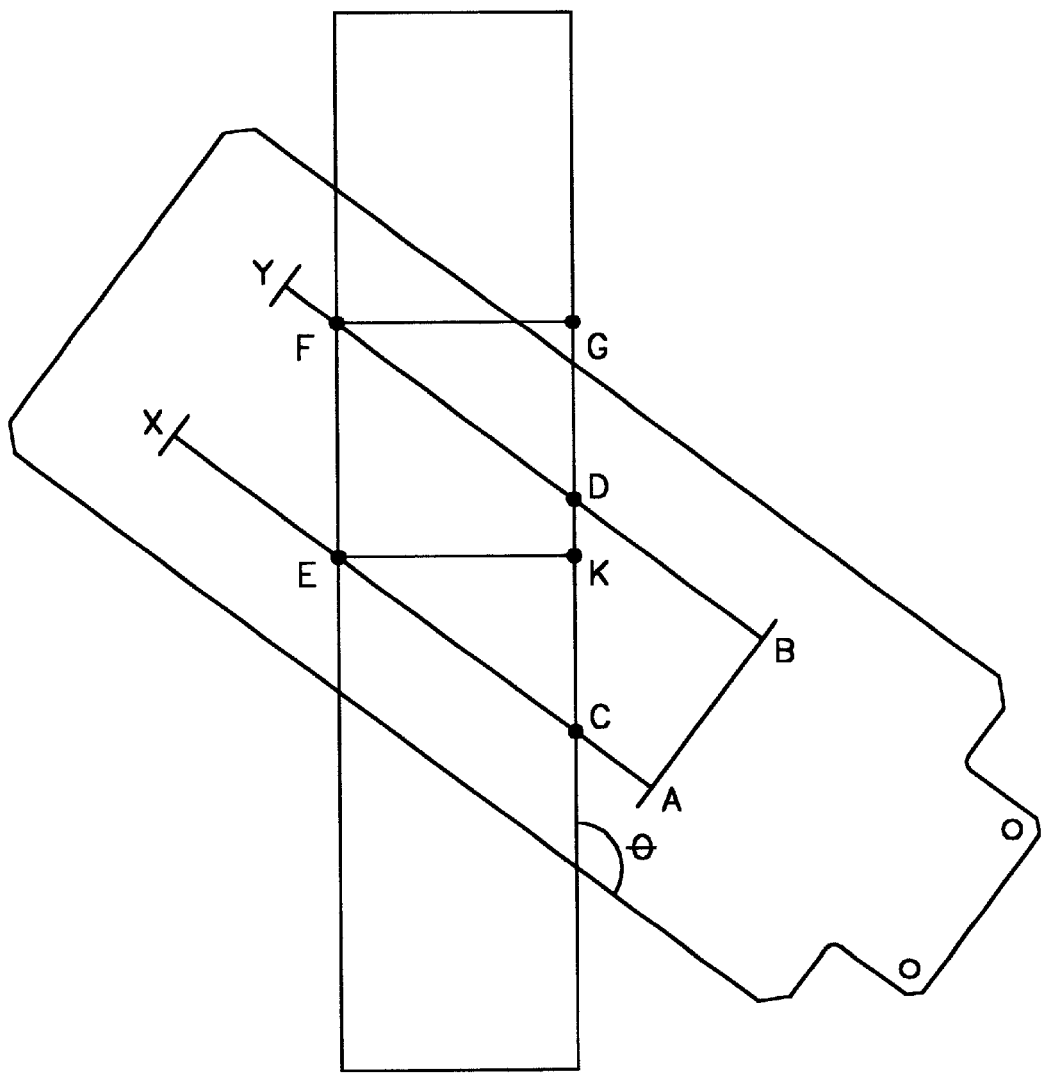

FIG. 12, however, shows pressure sensing device 10 disposed in a position that is not perpendicular to outer edges A—A and B—B of area 80. FIG. 13 illustrates pressure sensing device 10 in the same relative position as shown in FIG. 12, but also having dashed lines that show linear distances between various points on the device. In both figures, instead of being positioned substantially perpendicular to the axes of rollers, pressure sensing device 10 is positioned at an angle θ relative to the axes of the rollers. Because pressure sensing device 10 is not perpendicular to the axes of the rollers, the width measured will not equal the actual width of the nip between the rollers. This is demonstrated in FIG. 13, in which, according to the procedure previously discussed, the nip width would be erroneously calculated as the linear distance between point E and point C rather than the actual nip width equal to the linear distance between point E and point K. Alternately, the nip width would be erroneously calculated as the linear distance between point F and point D rather than the actual nip width equal to the linear distance between point F and point G.

In FIG. 13, the linear distance between point A and point X corresponds to the linear distance between electrodes 121 and 125 of a first pressure sensing arrangement, while the linear distance between point B and point Y corresponds to the linear distance between electrodes 121 and 125 of a second pressure sensing arrangement. In the preferred embodiment, the linear distances AX and BY are about 4.5 inches. According to one embodiment of the invention, these linear distances are previously known and are programmed into processor 160 for use in calculating the nip width, as will be discussed below.

FIG. 14 is a flow chart that illustrates the steps, according to one embodiment of the invention, performed by the nipped roller impression sensor system to insure that the nip width is accurately determined. In this embodiment, a pressure sensing device having two arrangements, as illustrated in FIGS. 12 and 13, is employed. At each step, measurements are taken by I/O device 150, and calculations are performed by processor 160. At step 200, prior to the exertion of pressure, the resistance between point A and point X, designated as $R_{AX\ open}$, and the resistance between point B and point Y, designated as $R_{BY\ open}$ are measured.

At step 202, pressure is exerted, i.e.—the sensor is inserted between the nipped rollers. The nip pressure is not known, and will be calculated in the steps below. At step 204, when pressure is exerted, the resistance between point A and point X, designated as $R_{AXclosed}$ is measured, as is the resistance between point B and point Y, designated as $R_{BYclosed}$. The resistance between point E and point C, designated as $R_{EC}$ and the resistance between point D and point F, designated as $R_{DF}$ are determined, using the following equations:

$$R_{EC}=R_{AX\ open}-R_{AXclosed};$$

and $$R_{DF}=R_{BY\ open}-R_{BYclosed}.$$

At step 206, I/O device 150 also measures the resistance between points A and C, designated as $R_{AC}$, and between points B and D, designated as $R_{BD}$. As previously discussed, resistances $R_{AC}$ and $R_{BD}$ exists because, when pressure is exerted on pressure sensing device 10, an electrical conduction is provided between first electrode 121 and shunt electrode 123.

At step 208, the resistance values are converted into a unit of length, such as "inches". For instance, if a resistance of 10 ohms is calculated, the resistance measurement is converted into a length of, for example, 10 inches. At step 210, coefficients c1 and c2 are calculated by processor 160 using the following equations:

$$c1=\text{length of } AX/R_{AX\ open};$$

and $$c2=\text{length of } BY/R_{BY\ open},$$

wherein the length of AX and the length of BY are predetermined and are programmed into processor 160. According to a preferred embodiment, the length of a AX and BY are approximately 4.5 inches.

At step 212, the linear distances between points E and C, points F and D, points A and C and points B and D are calculated using the following equations:

$$EC=c1\times R_{EC};$$

$$FD=c2\times R_{DF};$$

$$AC=c1\times R_{AC};$$

and $$BD=c2\times R_{BD}.$$

At step 214, the angle of the pressure sensing device 10 in relation to the rollers, designated angle θ, is calculated, using the following equation:

$$\tan\theta=\text{length } AB/[\text{length } AC-\text{length } AB];$$

wherein length AB is the linear distance between the first pressure sensing arrangement and the second pressure sensing arrangement.

At step 216, the two nip widths, designated as length EK and length FG, are calculated using the following equations:

$$\text{length } EK=\text{length } EC\times\sin\theta;$$

and $$\text{length } FG=\text{length } FD\times\sin\theta.$$

According to one embodiment of the invention, at step 218, processor 160 averages the two nip widths in order to obtain an average nip width using the following equation:

$$\text{average nip width}=[\text{length } EK+\text{length } FG]/2.$$

At step 220, according to one embodiment, processor 160 determines an amount of pressure corresponding to the calculated nip width. As previously discussed, the nip pressure corresponds to the nip width because, depending on the characteristics of the surface material of the rollers, the nip width increases as the pressure between the rollers increases. According to one embodiment, processor 160 is configured to have a look-up table, wherein each of a plurality of nip widths correspond to an amount of pressure between the rollers. In another embodiment, processor 160 is configured to calculate the amount of pressure between the rollers based upon the nip width and the compressibility of the material covering the surfaces of the rollers.

An additional advantage afforded by the present invention is that calibration due to temperature, humidity, etc. is not required. The conversion constants c1 and c2 referenced in step 210 of the flow chart in FIG. 14 eliminate the requirement for calibration because the resistance between the various electrodes is measured both before and after the exertion of pressure. Thus, the resistance measurement made prior to the exertion of pressure experiences the same error as the resistance measurement made after the exertion of pressure, and the error is cancelled out at step 212 of the flowchart. By contrast, the force sensing resistors of the prior art need to be calibrated before each use so as to account for temperature, humidity, aging, etc.

Figure 15:
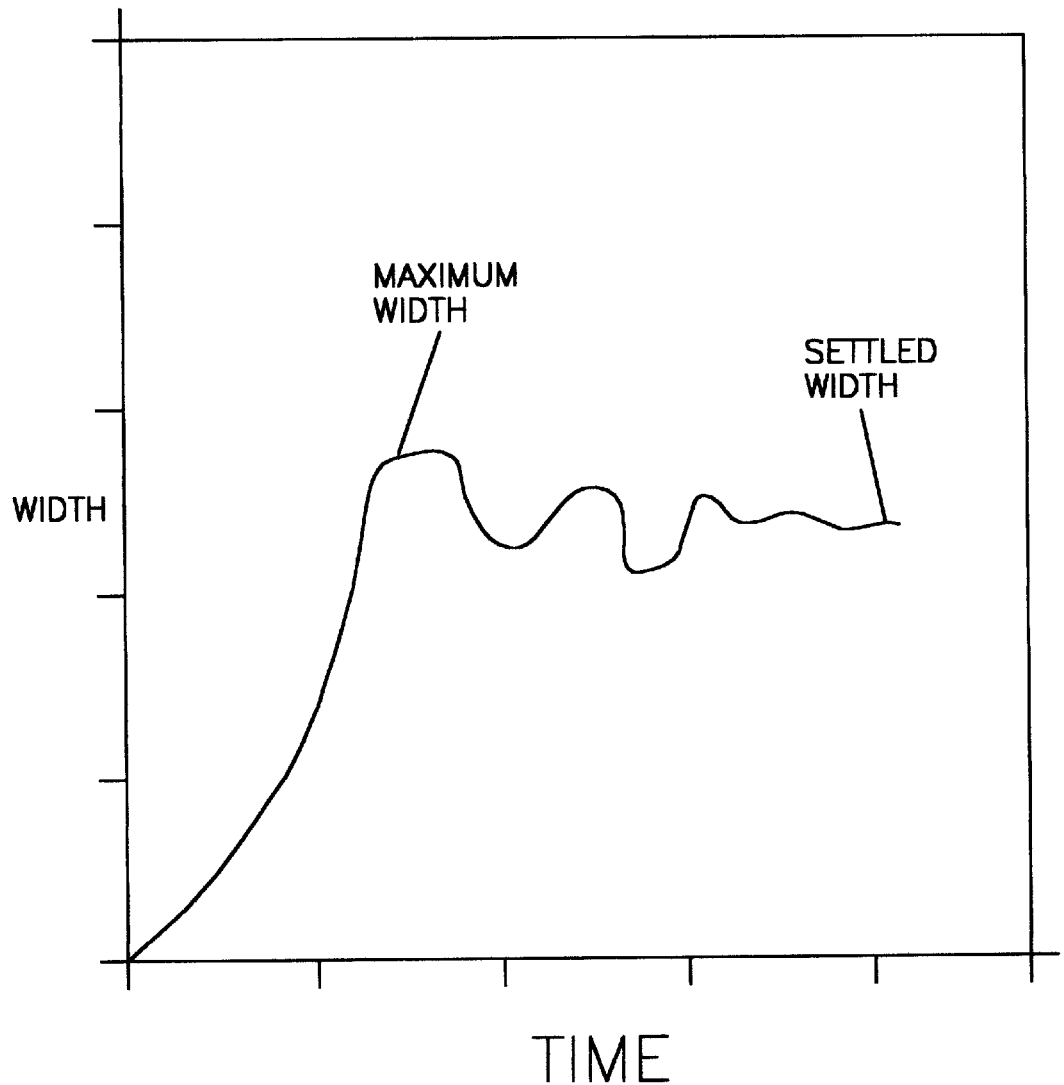
FIG. 15 is a graph that shows nip width as a function of time, in accordance with one embodiment of the invention.

The pressure sensing device, as just described, improves on the prior art carbon paper marking procedure. According to the prior art, the markings made by the carbon paper on the backing sheet are only representative of the largest nip width that is experienced between the rollers. FIG. 15 is a graph that illustrates the nip width caused by the pressure between the rollers as a function of time. As shown in the graph, a maximum nip width is experienced between the rollers shortly after the rollers are brought into contact with each other. However, the nip width oscillates until a settled width is experienced. The settled width is less than the maximum width, and typically is not experienced until the rollers have been in contact for about two minutes. Thus, the markings produced in the carbon paper procedure do not accurately reflect the settled width.

Figure 4:
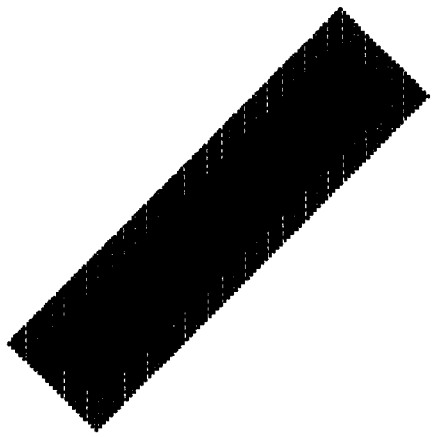
FIG. 4 illustrates a marking made by carbon paper, in accordance with the prior art.
Figure 5:
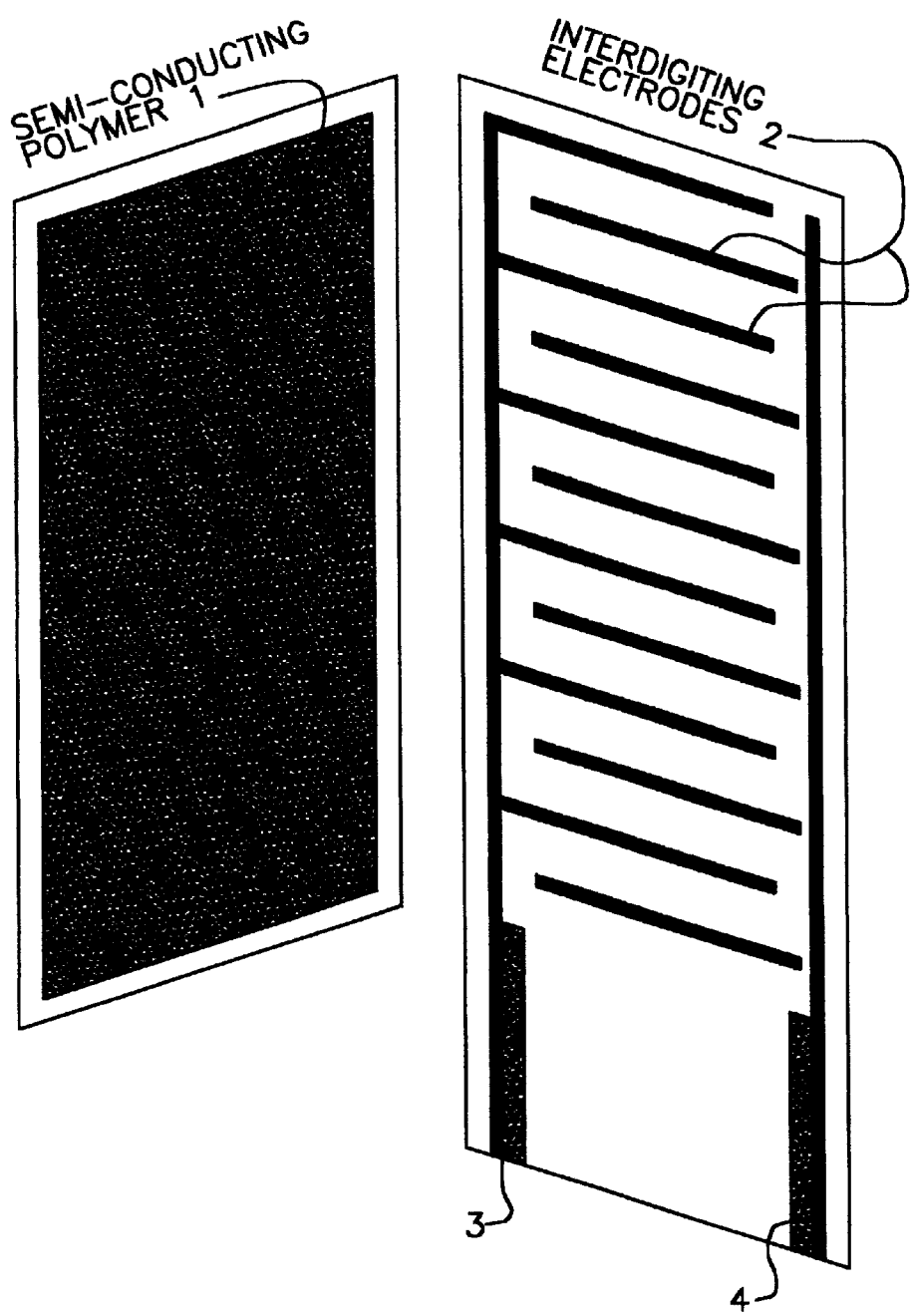
FIG. 5 illustrates a force sensing resistor, according to the prior art.
Figure 6:
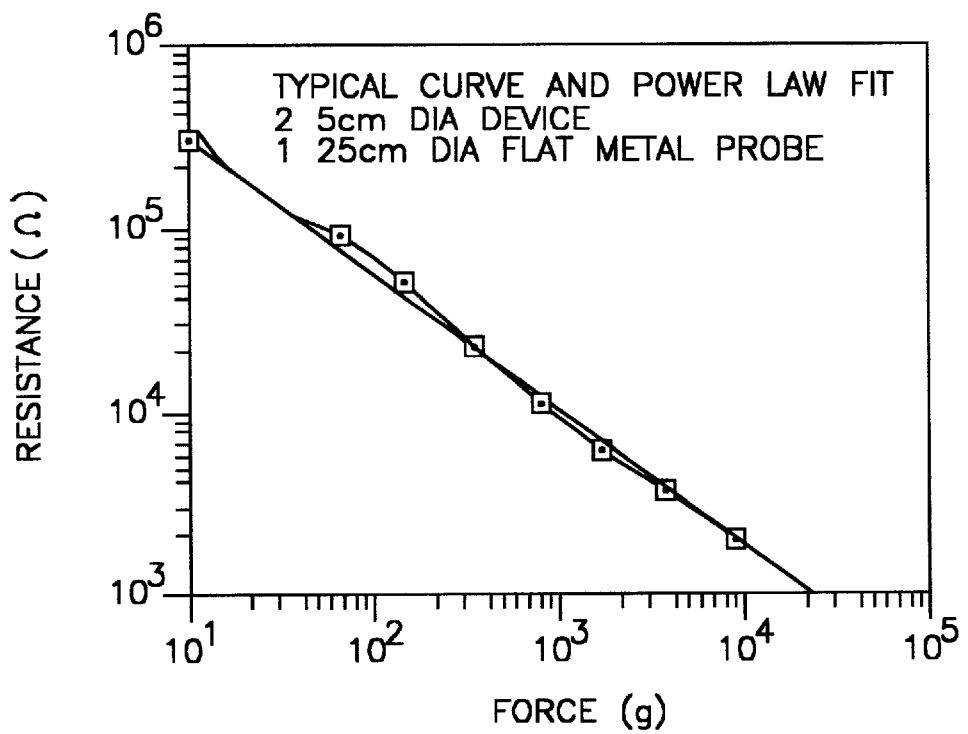
FIG. 6 is a graph that illustrates the force/resistance characteristics of a pressure responsive semi-conducting polymer, according to the prior art.
Figure 7:
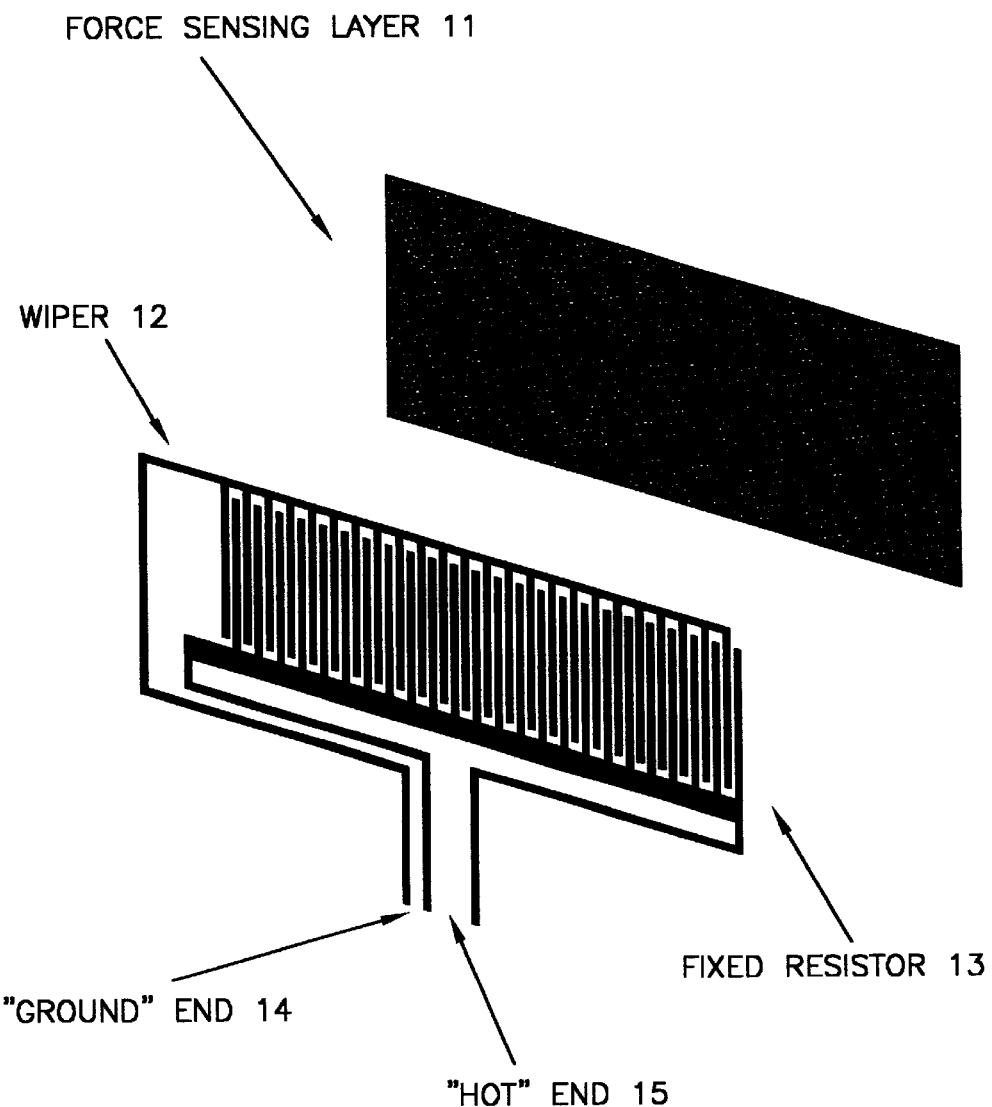
FIG. 7 illustrates a force and position sensing resistor, according to the prior art.

The shortcomings of the carbon paper marking procedure is demonstrated in FIG. 4. As previously mentioned, FIG. 4 shows a sample marking caused by the carbon paper procedure. As shown, the outer edges of the marking are fuzzy, thus making it difficult for a person who is analyzing the results to determine the settled width of the nip between the rollers. By contrast, the nip width calculated by processor 160, in accordance with one embodiment of the invention, accurately reflects the settled nip width, and thus permits a more accurate determination of the pressure between the rollers. According to one embodiment, the calculation of the nip width can be delayed until the settled width of the nip has been achieved.

Figure 16:
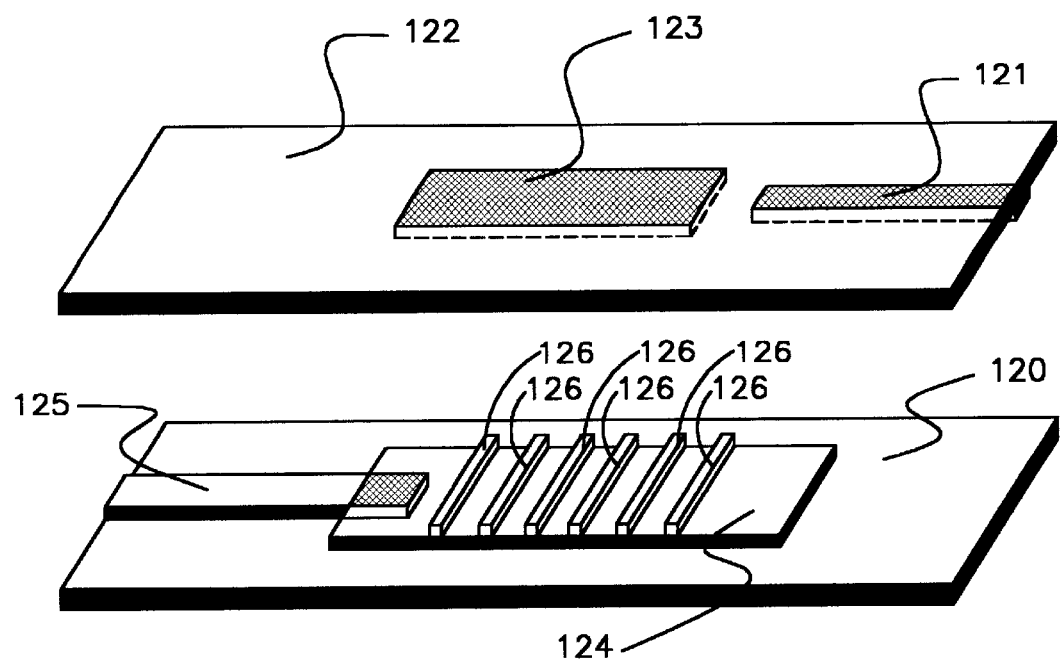
FIGS. 16–25 illustrate several embodiments of the pressure sensor device of the present invention, having various configurations.

It is recognized that there exists numerous embodiments having the features of the present invention. FIGS. 16–25 illustrate some of the embodiments. For instance, FIG. 16 illustrates a pressure sensing arrangement of the present invention substantially as described in connection with FIG. 8(c), but having first electrode 121 disposed on backing sheet 122. In this configuration, first electrode 121 contacts resistive electrode 124 when first backing sheet 120 and second backing sheet 122 are brought together. In all other respects, the pressure sensing device 10 of FIG. 16 operates in the same way as the pressure sensing device of FIG. 8(c).

Figure 17:
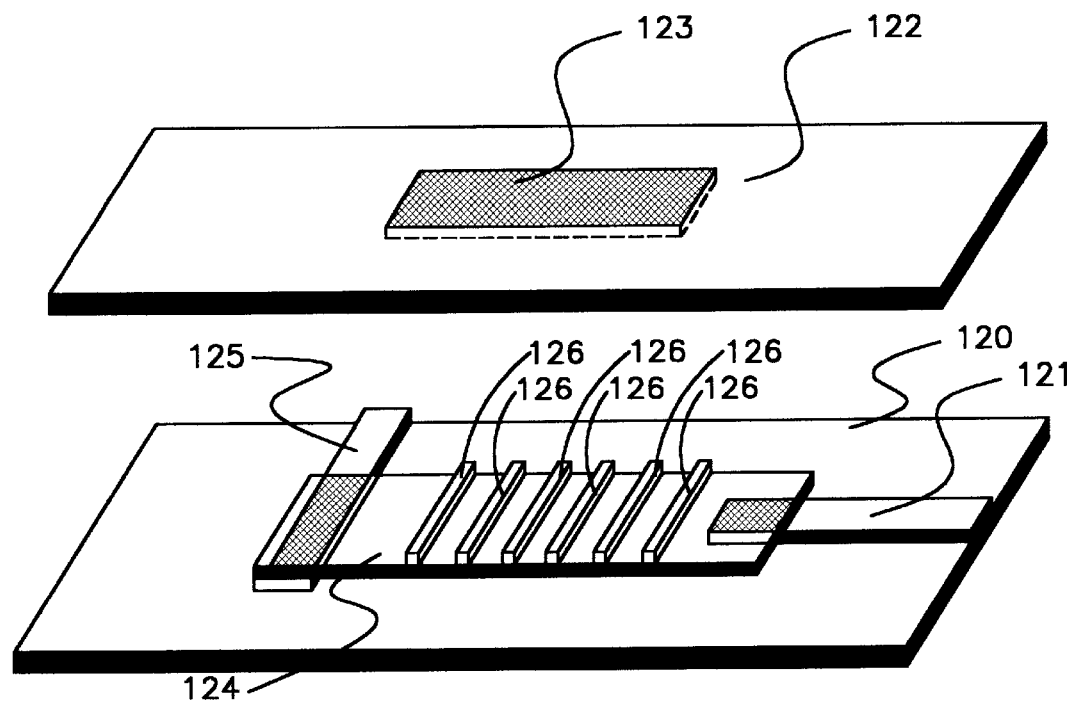
Figure 18:
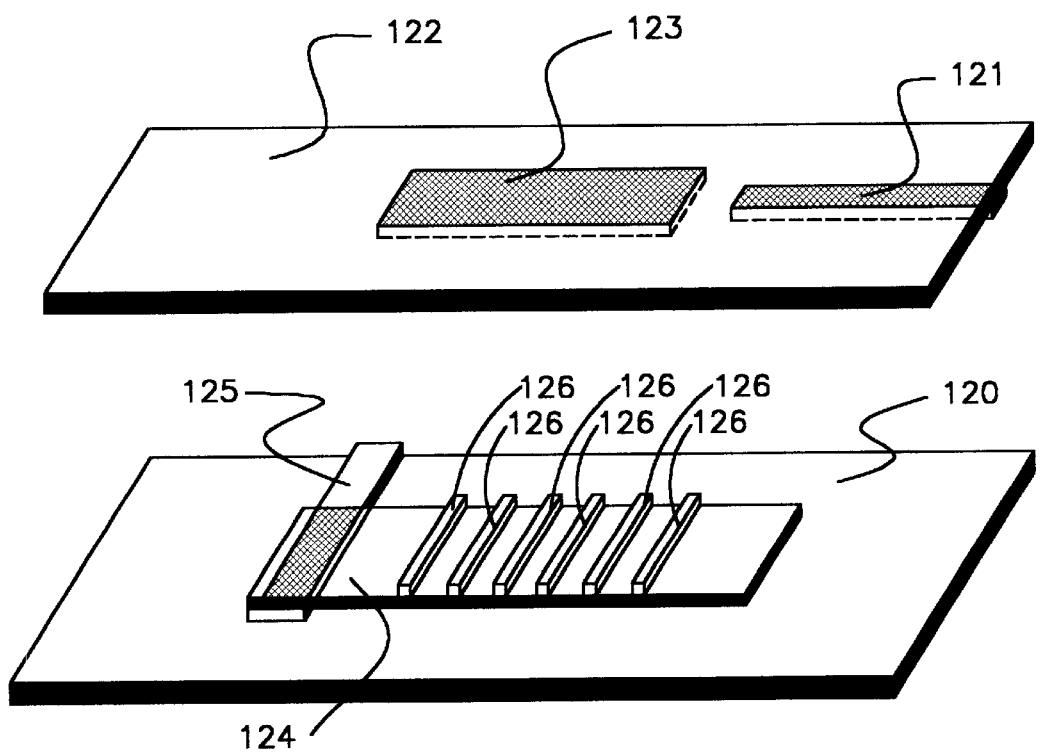

FIGS. 17 and 18 illustrate other configurations of pressure sensing device that also operate in the same way as the pressure sensing device in FIGS. 8(c) and 16. FIGS. 17 and 18 show second electrode 125 disposed on first backing sheet 120 at a 90 degree angle relative to its position in FIGS. 16 and 17, while first electrode 121 is alternatively disposed on first or second backing sheets, 120 and 122. As previously described, when first and second backing sheets 120 and 122 are brought together, resistive electrode 124 provides an electrical conduction between first electrode 121 and second electrode 125, and spacer elements 126 maintain shunt electrode 123 in a non-conductive arrangement with resistive electrode 124 until a pressure is applied to shunt electrode 123.

Figure 19:
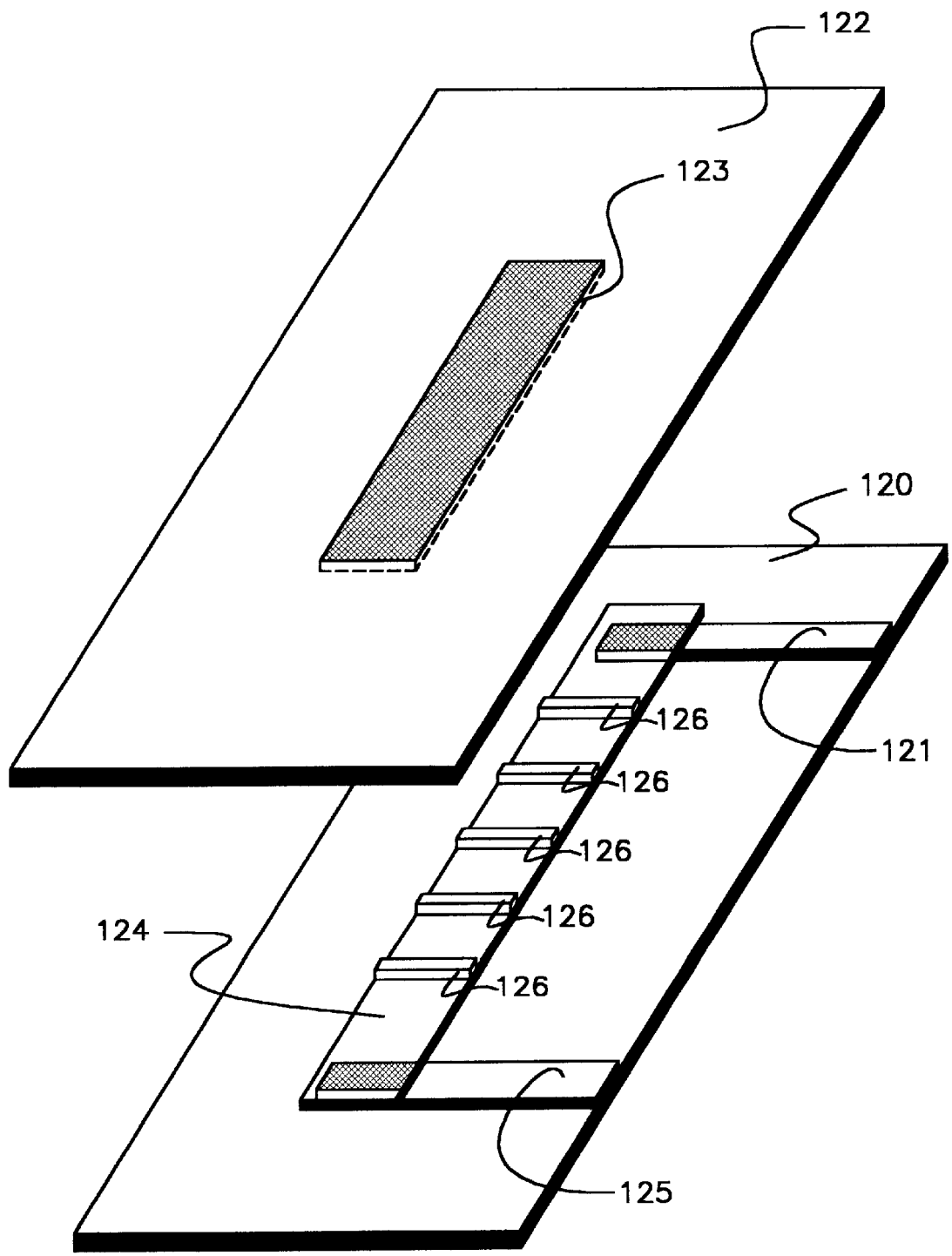
Figure 20:
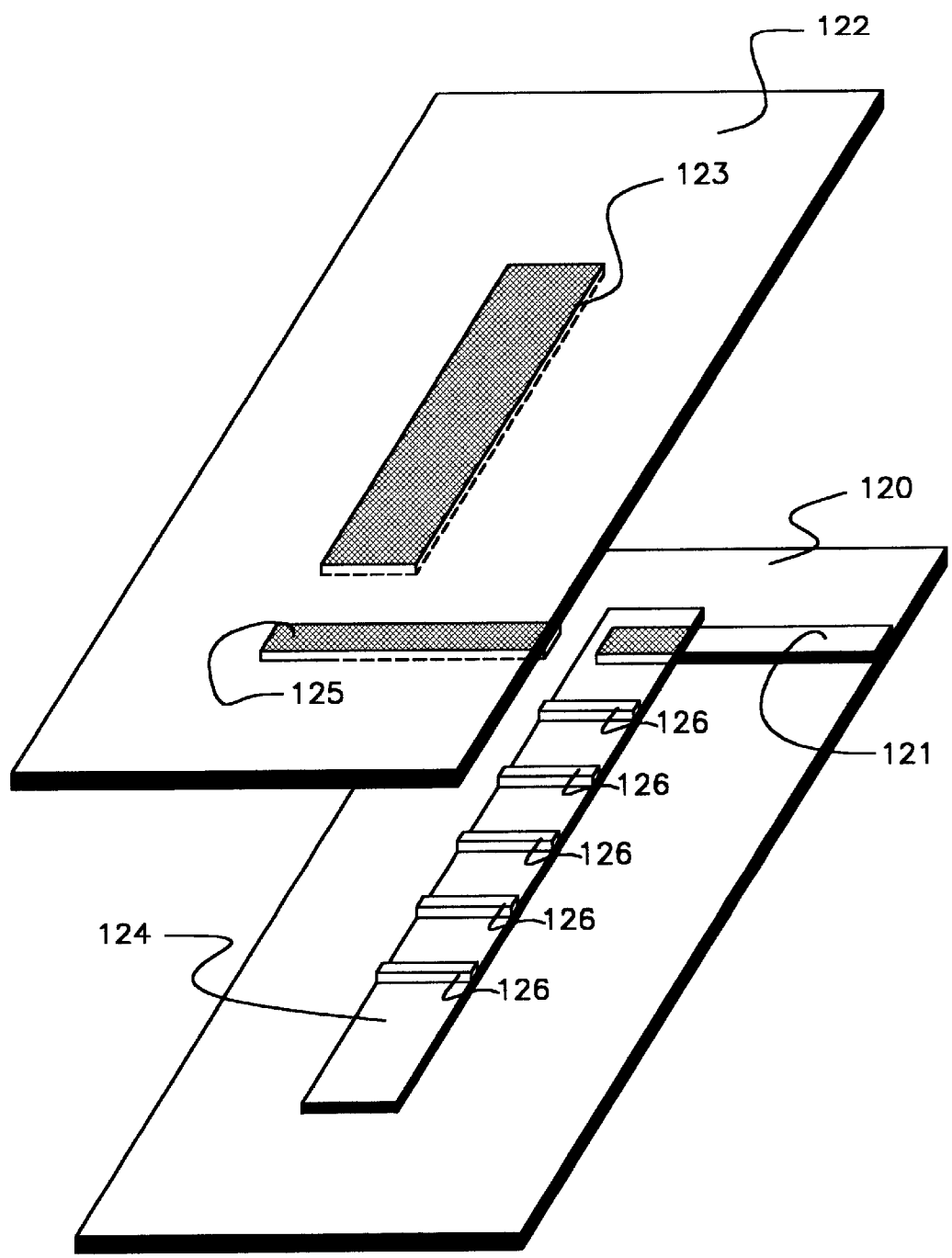

FIGS. 19 and 20 show both first and second electrodes 121 and 125 to be positioned at a 90 degree angle relative to their positions in FIGS. 8(c) and 16, while FIG. 19 shows both first and second electrodes 121 and 125 disposed on first backing sheet 120. FIG. 20, on the other hand, shows first electrode 121 disposed on first backing sheet 120 and second electrode 125 disposed on second backing sheet 122. It should be noted that the present invention is not limited in scope by which of the pair of backing sheets the electrodes are disposed on, or by the angle at which the electrodes are positioned on the backing sheets.

In each of the figures described, when first and second backing sheets 120 and 122 are brought together, resistive electrode 124 provides an electrical conduction between first electrode 121 and second electrode 125, and spacer elements 126 maintain shunt electrode 123 in a non-conductive arrangement with resistive electrode 124 until a pressure is applied to shunt electrode 123. The current shunted through shunt electrode 123 causes a change in the resistance measured between the electrodes, which corresponds to the width of the nip and the position of the nip on the sensor.

Figure 21:
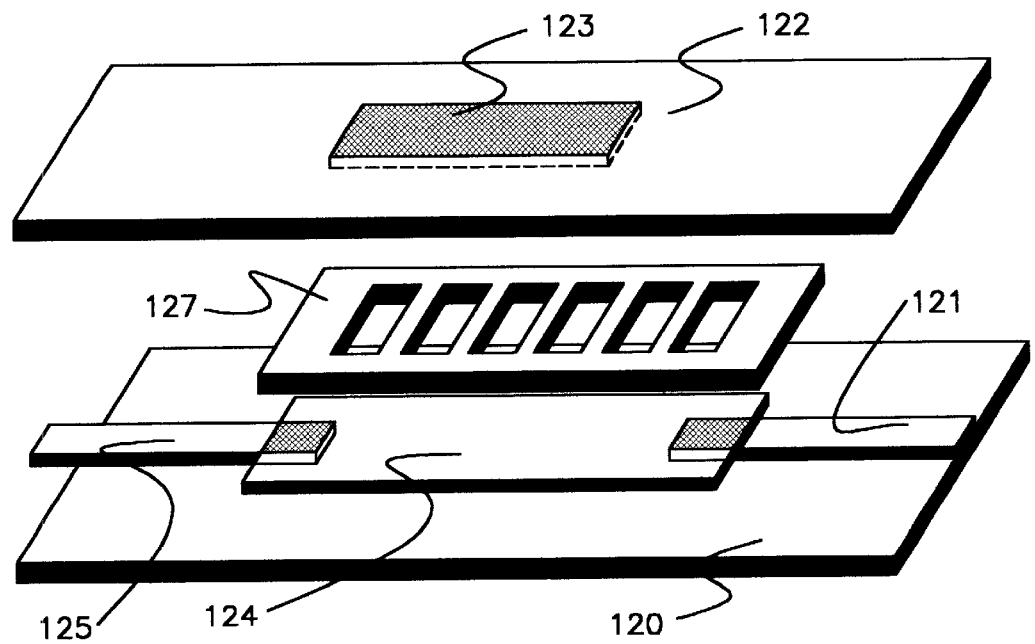
Figure 22:
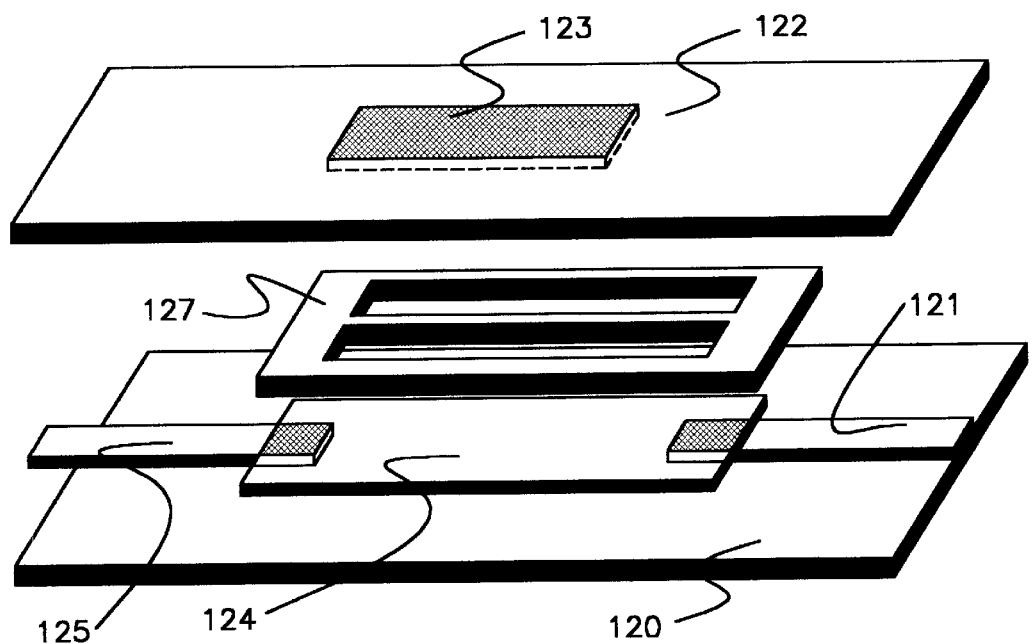
Figure 24:
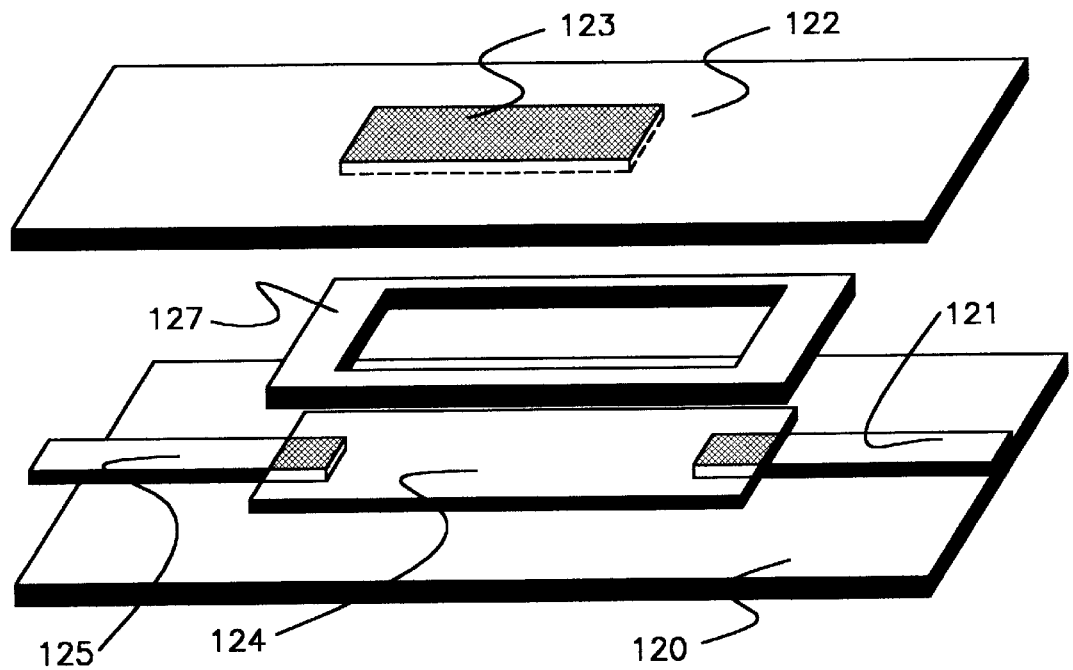

FIGS. 21, 22 and 24 illustrate some of the various configurations of spacers 126 contemplated by the present invention. FIG. 21 illustrates one embodiment, in which several spacer elements 126 are replaced by windowed spacer 127 having a plurality of windows. In this embodiment, windowed spacer 127 performs an identical function to the spacer elements described in connection with the previously described figures. Between each window is spacer material which maintains shunt electrode 123 in a non-conducting arrangement with resistive electrode 124. When a pressure is applied to shunt electrode 123, shunt electrode 123 is displaced through the windows of spacer 127 so as to contact resistive electrode 124 and causes current to be shunted through shunt electrode 123. While the figure shows six windows disposed in spacer 127, it is understood that any number of windows can be disposed therein without deviating from the intended scope of the present invention.

In this embodiment, the greater the number of windows disposed in spacer 127, the greater the resolution of the pressure sensing device. This follows because, as the number of windows increase, the spacer material between each window is closer together, and an applied pressure is spread over an even smaller area. A similar result occurs when the number of spacer elements 126 in the embodiment shown and described in FIG. 10 is increased, because the greater number of spacer elements 126a further prevent shunt electrode 123 from contacting resistive electrode 124 except at the precise location of an applied pressure.

FIG. 22 shows an another embodiment of the invention employing a windowed spacer 128, wherein the windows of the spacer have a different arrangement. In this embodiment, the windows are arranged lengthwise along spacer 128, so as to cause current to be shunted through shunt electrode 123 in a different manner when a pressure is applied to the sensor. FIG. 24 shows still another embodiment of the invention employing a windowed spacer 129, wherein spacer 129 has a single window. As indicated previously, a single window in spacer 129 provides less resolution to the pressure sensing device because an applied force is spread over shunt electrode 123.

Figure 23:
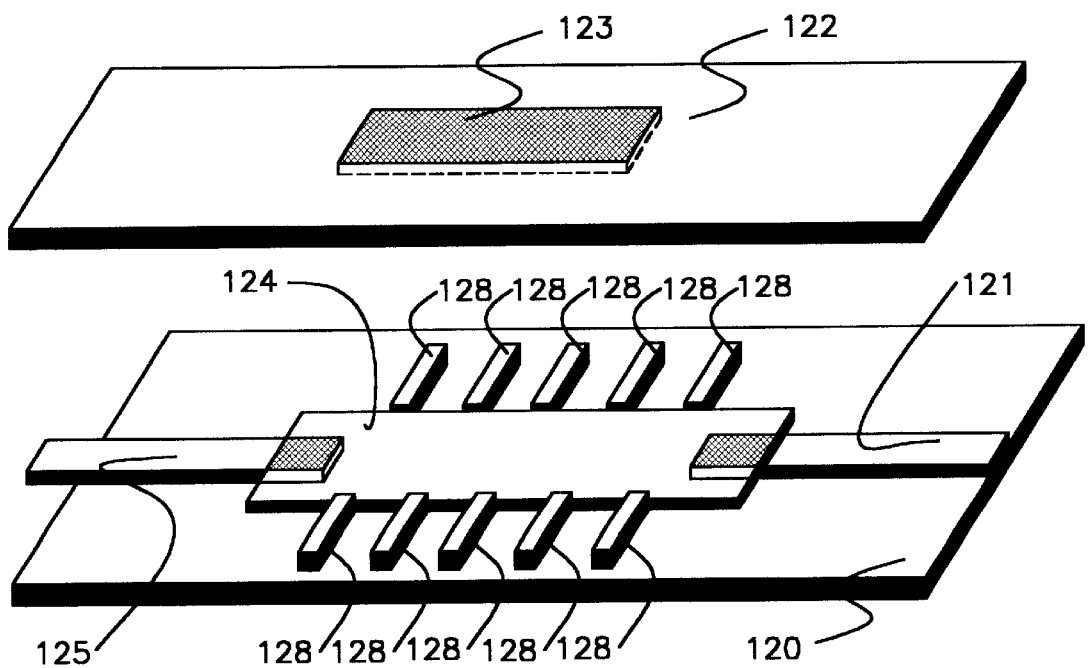

FIG. 23 illustrates still another embodiment of the invention, wherein a plurality of spacer elements 128 are disposed directly on first backing sheet 122, along opposite edges of resistive electrode 124. In this embodiment, the plurality of spacer elements 128 preferably have a height that is greater than the height of resistive electrode 124 relative to first backing sheet 120. In addition, shunt electrode 123 has a width which is greater than the distance between the spacer elements disposed on opposite edges of resistive electrode 124. In this way, when first and second backing sheets 120 and 122 are brought together, shunt electrode 123 is disposed in a non-conductive arrangement with resistive electrode 124. In this embodiment, however, spacer elements 128 do not operate to localize an applied pressure by preventing spreading, as previously discussed.

Figure 25:
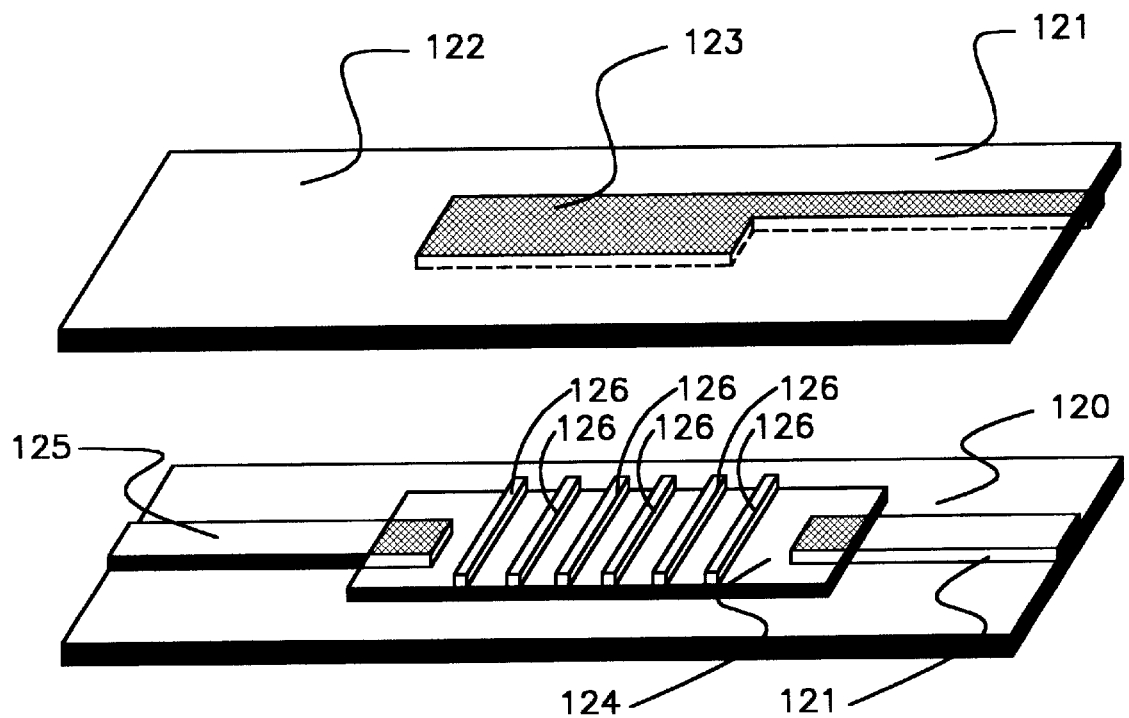

FIG. 25 shows still another embodiment of the present invention, wherein shunt electrode 124 further comprises a connector that extends to the edge of second backing sheet 122. The connector provides a means for electrically connecting shunt electrode 123 to an electrical source or other device, if desired.

Figure 26:
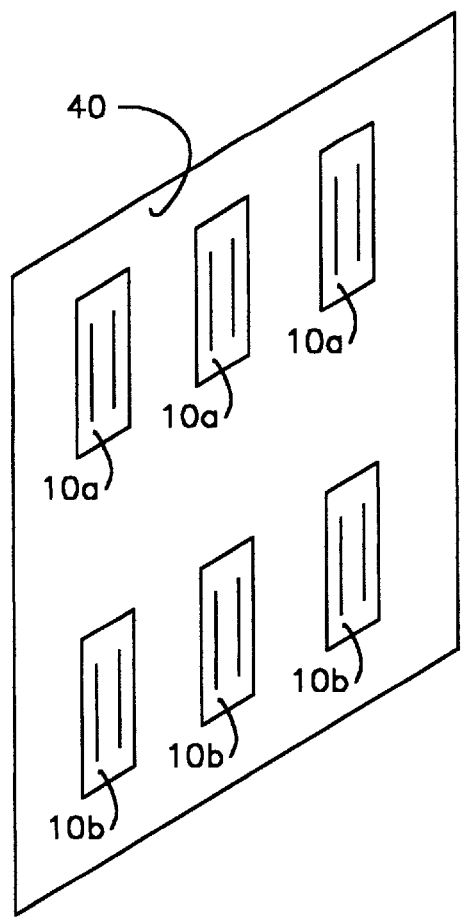
FIGS. 26 and 27 illustrate a matrix of sensors disposed on a sheet so as to simultaneously take measurements between multiple pairs of rollers, in accordance with one embodiment of the invention.
Figure 27:
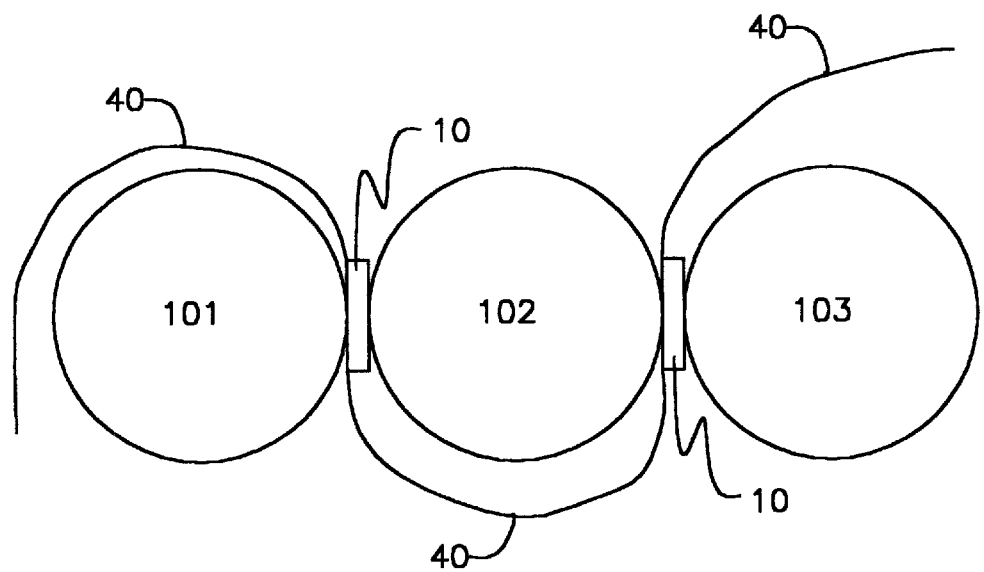

In FIG. 26, according to yet another embodiment of the invention, a plurality of pressure sensing devices 10 are disposed in a matrix on sheet 40, so as to simultaneously measure the nip widths at several points along a roller and between successive pairs of rollers. For instance, FIG. 27 shows three rollers 101, 102 and 103 operatively engaging each other, and having sheet 40 disposed therebetween. The row of sensors comprising sensors 10a is disposed at the nip between rollers 101 and 102, while the row of sensors comprising sensors 10b is disposed at the nip between rollers 102 and 103. Advantageously, the distance between row of sensors 10a and row of sensors 10b is a specifiable distance that corresponds to the circumferential distance around roller 102 from one nip to the other nip. As shown, the row of sensors also enables a measurement to be taken at various points along a single nip, so as to check the uniformity along the roller. It is noted that, according to the present invention, any number of rows and columns of sensors 10 disposed on sheet 40 is contemplated.

Thus, the present invention solves problems associated with devices and methods of the prior art. For instance, according to one embodiment, the present invention does not employ a pressure-sensitive resistive material. Instead, the present invention employs resistive and shunt electrodes that are spaced apart from each other by spacers until a pressure is exerted thereon, so as to measure the width and position of a nip between two rollers. Additionally, the present invention avoids the need for calibration due to such variables as temperature, humidity, and aging.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirt of the invention. It is the intention, therefore, to be limited only as indicated by the scope of the claims appended hereto.

It is to be understood that the drawings are not necessarily drawn to scale, but that they are merely conceptual in nature.

We claim:

1. A nipped roller impression sensor system for measuring a nip width defined as a linear distance between two outer locations of pressure comprising:
   a first roller having an axis of rotation and a surface;
   a second roller having an axis of rotation that is substantially parallel to said axis of rotation of said first roller, said second roller disposed so that a surface of said second roller exerts pressure on said surface of said first roller at a nip having a width; and
   a pressure sensor device disposed at said nip between said first and second rollers, said pressure sensor device having a resistive electrode maintained in a non-conductive arrangement with a continuous shunt electrode by a plurality of spacer elements, said plurality of spacer elements defining at least one contact region disposed along said resistive electrode, such that, when said pressure is exerted between said rollers, on any portion of said pressure sensitive device, said resistive electrode is shunted within said contact region for a distance substantially equal to the distance between said outer locations of said pressure is measured in response to a change in resistance across said resistive electrode.

2. The system according to claim 1, further comprising a connector coupled to said shunt electrode, so as to allow measurement of resistance between said connector and said resistive electrode, wherein a position of said nip corresponds to a change in said resistance between said shunt electrode and said resistive electrode.

3. The system according to claim 2, further comprising a means for measuring a change in resistance across said resistive electrode and a change in resistance between said shunt electrode and said resistive electrode.

4. The system according to claim 3, further comprising a processor for calculating said width and position of said nip.

5. The system according to claim 4, wherein said impression sensor system comprises two said pressure sensor devices, and said processor calculates a nip width and a position of said nip at each said pressure sensor device.

6. The system according to claim 5, wherein said processor is further configured to adjust said nip width calculated by said processor if a position of said nip measured by a first of said pressure sensor devices differs from said position of said nip measured by a second of said pressure sensor devices.

7. The system according to claim 6, wherein said nip width adjusted by said processor corresponds to angle of said pressure sensor device relative to said rollers.

8. The system according to claim 4, wherein said nip width calculated by said processor corresponds to a pressure between said rollers.

9. The system according to claim 8, wherein said processor adjusts a position of said rollers until said nip width between said rollers corresponds to a desired nip width between said roller.

10. The system according to claim 1, wherein said plurality of spacer elements are selected from a group consisting of Mylar, Kapton and polyester.

11. The system according to claim 1, wherein said plurality of spacer elements are disposed on at least one of a pair of backing sheets on opposite edges of said resistive electrode, each of said plurality of spacer elements having a height that is greater than a height of said resistive electrode, and said shunt electrode having a width which is greater than a distance between said plurality of spacer elements.

12. The system according to claim 1, wherein said shunt electrode is comprised of a material selected from a group consisting of copper, silver, aluminum and conductive ink.

13. The system according to claim 1, wherein said shunt electrode is comprised of conductive ink, said conductive ink comprising a graphite-base polymer, thick film ink.

14. The system according to claim 1, wherein said resistive electrode is comprised of a material selected from a group consisting of carbon and a non-conductive ink.

15. The system according to claim 14, wherein said resistive electrode is comprised of non-conductive ink, said non-conductive ink comprising a titanium dioxide resistive ink.

16. The system according to claim 1, wherein said shunt electrode and said resistive electrode are disposed on one of a pair of backing sheets, wherein said backing sheets are thin and flexible.

17. The system according to claim 16, wherein one of said pair of backing sheets is comprised of a material selected from the group consisting of mylar, Kapton and polyester.

18. The system according to claim 1, wherein said pressure sensor apparatus is laminated.

19. The system according to claim 1, further comprising an insertion device for disposing said pressure sensor device at said nip.

20. A nipped roller impression sensor system for measuring a nip width defined as a linear distance between two outer locations of pressure comprising:
   a first roller having an axis of rotation and a surface;
   a second roller having an axis of rotation that is substantially parallel to said axis of rotation of said first roller, said second roller disposed so that a surface of said second roller exerts pressure on said surface of said first roller at a nip having a width; and
   a pressure sensor device disposed at said nip between said first and second rollers, said pressure sensor device having a resistive electrode with a first and second end, said resistive electrode maintained in a non-conductive arrangement with a shunt electrode by a spacer element defining at least one contact window disposed along a length between said first and second ends of said resistive electrode, such that, when said pressure is exerted on any portion thereon between said rollers, said resistive electrode is shunted for a distance substantially equal to the distance between said outer locations of said pressure such that said linear distance between two outer locations of pressure is measured in response to a change in resistance across said resistive electrode.

21. The system according to claim 20, wherein a position of said nip corresponds to a resistance between said shunt electrode and said resistive electrode.

22. The system according to claims 21, further comprising a means for measuring resistance across said resistive electrode and resistance between said shunt electrode and said resistive electrode.

23. The system according to claim 22, further comprising a processor for calculating said width and position of said nip.

24. The system according to claim 23, wherein said impression sensor system comprises two said pressure sensor devices, and said processor calculates a nip width and a position of said nip at each said pressure sensor device.

25. The system according to claim 24, wherein said processor is further configured to adjust said nip width calculated by said processor if a position of said nip measured by a first of said pressure sensor devices differs from said position of said nip measured by a second of said pressure sensor devices.

26. The system according to claim 25, wherein said nip width adjusted by said processor corresponds to the angle of said pressure sensor device relative to said rollers.

27. The system according to claim 23, wherein said nip width calculated by said processor corresponds to a pressure between said rollers.

28. The system according to claim 27, wherein said processor adjusts a position of said rollers until nip width between said rollers corresponds to a desired nip width between said rollers.

29. The system according to claim 20, wherein said at least one spacer element is selected from a group consisting of Mylar, Kapton and polyester.

30. The system according to claim 20, wherein said shunt electrode is comprised of a material selected from a group consisting of copper, silver, aluminum and conductive ink.

31. The system according to claim 20, wherein said shunt electrode is comprised of conductive ink, said conductive ink comprising a graphite-base polymer, thick film ink.

32. The system according to claim 20, wherein said resistive electrode is comprised of a material selected from a group consisting of carbon and a non-conductive ink.

33. The system according to claim 32, wherein said resistive electrode is comprised of non-conductive ink, said non-conductive ink comprising a titanium dioxide resistive ink.

34. The system according to claim 20, wherein said shunt electrode and said resistive electrode are disposed on one of a pair of backing sheets, wherein said backing sheets are thin and flexible.

35. The system according to claim 34, wherein one of said pair of backing sheets is comprised of a material selected from the group consisting of mylar, Kapton and polyester.

36. The system according to claim 20, wherein said pressure sensor apparatus is laminated.

37. The system according to claim 20, further comprising an insertion device for disposing said pressure sensor device at said nip.

38. A nip system for measuring a nip between two rollers, wherein a first roller has an axis of rotation substantially parallel to an axis of rotation of a second roller and a surface exerting pressure on a surface of said second roller so as to define said nip, said system comprising:
  a plurality of pressure sensor devices disposed along a length of said rollers at said nip, each said pressure sensor device comprising:
  a continuous shunt electrode;
  a resistive electrode; and
  a plurality of spacer elements,
  wherein said resistive electrode is maintained in a non-conductive arrangement with said shunt electrode by said plurality of spacer elements, said plurality of spacer elements defining at least one contact region disposed along said resistive electrode, such that, when said pressure is exerted between said rollers on any portion on said pressure sensor device, said resistive electrode is shunted for a distance substantially equal to the distance between said outer locations of said pressure such that said linear distance between two outer locations of pressure is measured in response to a change in resistance across said resistive electrode.

39. The system according to claim 38, further comprising a means for measuring a change in resistance across said resistive electrode.

40. The system according to claim 39, further comprising a processor for calculating said width of said nip.

41. The system according to claim 42, wherein a position of said nip corresponds to a resistance between said shunt electrode and said resistive electrode.

42. The system according to claim 41, wherein said system comprises two said pressure sensor devices, and said processor calculates a nip width and a position of said nip at each said pressure sensor device.

43. The system according to claim 42, wherein said processor is further configured to adjust said nip width calculated by said processor if a position of said nip measured by a first of said pressure sensor devices differs from said position of said nip measured by a second of said pressure sensor devices.

44. The system according to claim 43, wherein said nip width adjusted by said processor corresponds to the angle of said pressure sensor device relative to said rollers.

45. A nip system for measuring a nip between two rollers, wherein a first roller has an axis of rotation substantially parallel to an axis of rotation of a second roller and a surface exerting pressure on a surface of said second roller so as to define said nip, said system comprising:
  a plurality of pressure sensor devices disposed along a length of said rollers at said nip, each said pressure sensor device comprising:
  a continuous shunt electrode;
  a resistive electrode; and
  a plurality of spacer elements,
  wherein said resistive electrode is maintained in a non-conductive arrangement with said shunt electrode by said plurality of spacer elements when substantially no pressure acts on said pressure sensor device, said plurality of spacer elements defining at least one contact region disposed along said resistive electrode, such that, when a pressure is exerted between said rollers on any portion on said pressure sensor device, said resistive electrode is shunted for a distance substantially equal to the distance between said outer locations of said pressure such that a position of one of said outer locations of said pressure is measured in response to a resistance between said resistive electrode and said shunt electrode.

46. The system according to claim 45, wherein said shunt electrode further comprises a connector for measuring said resistance between said shunt electrode and said resistive electrode.

47. The system according to claim 45, wherein said shunt electrode further comprises a connector for measuring said resistance between said shunt electrode and said resistive electrode, before and after exertion of said pressure.

48. The system according to claim 45, wherein said distance between said outer locations of pressure is measured in response to a change in resistance of said resistive electrode, before and after exertion of said pressure.

* * * * *